(12) United States Patent
Lee et al.

(10) Patent No.: US 7,847,999 B2
(45) Date of Patent: Dec. 7, 2010

(54) INTERFEROMETRIC MODULATOR DISPLAY DEVICES

(75) Inventors: Donovan Lee, Daly City, CA (US); Kasra Khazeni, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 320 days.

(21) Appl. No.: 11/971,830

(22) Filed: Jan. 9, 2008

(65) Prior Publication Data
US 2009/0073534 A1 Mar. 19, 2009

Related U.S. Application Data

(60) Provisional application No. 60/972,717, filed on Sep. 14, 2007.

(51) Int. Cl.
*G02F 1/03* (2006.01)

(52) U.S. Cl. ....................... 359/247; 359/291

(58) Field of Classification Search .......... 359/291, 359/290, 292, 245, 247, 250, 254, 259, 337.2, 359/902, 302, 298, 316, 305, 308
See application file for complete search history.

(56) References Cited

U.S. PATENT DOCUMENTS

| | | | |
|---|---|---|---|
| 3,037,189 A | 5/1962 | Barrett et al. | |
| 3,210,757 A | 10/1965 | Jacob | |
| 3,247,392 A | 4/1966 | Thelen | |
| 3,701,586 A | 10/1972 | Goetz | |
| 3,728,030 A | 4/1973 | Hawes | |
| 3,886,310 A | 5/1975 | Guldberg | |
| 3,955,190 A | 5/1976 | Teraishi | |
| 4,087,810 A | 5/1978 | Hung et al. | |
| 4,403,248 A | 9/1983 | te Velde | |

(Continued)

FOREIGN PATENT DOCUMENTS

EP          0 361 981          4/1990

(Continued)

OTHER PUBLICATIONS

Pape et al., Characteristics of the deformable mirror device for optical information processing, Optical Engineering, 22(6):676-681, Nov.-Dec. 1983.

(Continued)

*Primary Examiner*—Ricky L Mack
*Assistant Examiner*—Tuyen Q Tra
(74) *Attorney, Agent, or Firm*—Knobbe, Martens, Olson & Bear, LLP

(57) ABSTRACT

An embodiment for a pixel for a display device on a substrate is disclosed. The pixel includes a first interferometric modulator on the substrate. The first interferometric modulator has a first normal direction substantially perpendicular to the first interferometric modulator and a first angularly-dependent reflectivity function comprising a first reflectivity in a first direction and a second reflectivity in a second direction, with the first reflectivity being greater than the second reflectivity. The pixel also includes a second interferometric modulator on the substrate. The second interferometric modulator has a second normal direction substantially perpendicular to the second interferometric modulator and a second angularly-dependent reflectivity function comprising a third reflectivity in the second direction and a fourth reflectivity in the first direction, with the third reflectivity being greater than the fourth reflectivity.

23 Claims, 17 Drawing Sheets

U.S. PATENT DOCUMENTS

| | | | |
|---|---|---|---|
| 4,421,381 A | 12/1983 | Ueda et al. | |
| 4,441,789 A | 4/1984 | Pohlack | |
| 4,441,791 A | 4/1984 | Hornbeck | |
| 4,498,953 A | 2/1985 | Cook et al. | |
| 4,560,435 A | 12/1985 | Brown et al. | |
| 4,655,554 A | 4/1987 | Armitage | |
| 4,786,128 A | 11/1988 | Birnbach | |
| 4,859,060 A | 8/1989 | Katagiri et al. | |
| 4,925,259 A | 5/1990 | Emmett | |
| 4,954,789 A | 9/1990 | Sampsell | |
| 4,956,619 A | 9/1990 | Hornbeck | |
| 4,973,131 A | 11/1990 | Carnes | |
| 4,980,775 A * | 12/1990 | Brody | 348/383 |
| 4,982,184 A | 1/1991 | Kirkwood | |
| 5,022,745 A | 6/1991 | Zahowski et al. | |
| 5,028,939 A | 7/1991 | Hornbeck et al. | |
| 5,034,351 A | 7/1991 | Sun et al. | |
| 5,062,689 A | 11/1991 | Koehler | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |
| 5,337,191 A | 8/1994 | Austin | |
| 5,381,232 A | 1/1995 | Van Wijk | |
| 5,422,310 A | 6/1995 | Ito | |
| 5,452,138 A | 9/1995 | Mignardi et al. | |
| 5,457,900 A | 10/1995 | Roy et al. | |
| 5,471,341 A | 11/1995 | Warde et al. | |
| 5,499,037 A | 3/1996 | Nakagawa et al. | |
| 5,526,172 A | 6/1996 | Kanack | |
| 5,559,358 A | 9/1996 | Burns et al. | |
| 5,561,523 A | 10/1996 | Blomberg et al. | |
| 5,636,052 A | 6/1997 | Arney et al. | |
| 5,638,084 A | 6/1997 | Kalt | |
| 5,646,729 A | 7/1997 | Koskinen et al. | |
| 5,646,768 A | 7/1997 | Kaeiyama | |
| 5,661,592 A | 8/1997 | Bornstein et al. | |
| 5,665,997 A | 9/1997 | Weaver et al. | |
| 5,699,181 A | 12/1997 | Choi | |
| 5,710,656 A | 1/1998 | Goosen | |
| 5,719,068 A | 2/1998 | Suzawa et al. | |
| 5,734,177 A | 3/1998 | Sakamoto | |
| 5,786,927 A | 7/1998 | Greywall et al. | |
| 5,796,378 A | 8/1998 | Yoshida | |
| 5,808,781 A | 9/1998 | Arney et al. | |
| 5,818,095 A | 10/1998 | Sampsell | |
| 5,825,528 A | 10/1998 | Goosen | |
| 5,835,256 A | 11/1998 | Huibers | |
| 5,838,484 A | 11/1998 | Goossen et al. | |
| 5,867,301 A | 2/1999 | Engle | |
| 5,867,302 A | 2/1999 | Fleming | |
| 5,894,686 A | 4/1999 | Parker et al. | |
| 5,905,482 A | 5/1999 | Hughes et al. | |
| 5,914,804 A | 6/1999 | Goossen | |
| 5,920,418 A | 7/1999 | Shiono et al. | |
| 5,959,777 A | 9/1999 | Whitehead | |
| 5,961,848 A | 10/1999 | Jacquet et al. | |
| 5,986,796 A | 11/1999 | Miles | |
| 6,028,689 A | 2/2000 | Michalicek et al. | |
| 6,040,937 A | 3/2000 | Miles | |
| 6,046,659 A | 4/2000 | Loo et al. | |
| 6,055,090 A | 4/2000 | Miles | |
| 6,100,861 A | 8/2000 | Cohen et al. | |
| 6,123,431 A | 9/2000 | Teragaki et al. | |
| 6,242,932 B1 | 6/2001 | Hembree | |
| 6,262,696 B1 | 7/2001 | Seraphim et al. | |
| 6,262,697 B1 | 7/2001 | Stephenson | |
| 6,282,010 B1 | 8/2001 | Sulzbach et al. | |
| 6,285,424 B1 | 9/2001 | Yoshida | |
| 6,327,071 B1 | 12/2001 | Kimura | |
| 6,335,235 B1 | 1/2002 | Bhekta et al. | |
| 6,356,378 B1 | 3/2002 | Huibers | |
| 6,377,233 B2 | 4/2002 | Colgan et al. | |
| 6,377,321 B1 | 4/2002 | Khan et al. | |
| 6,384,952 B1 | 5/2002 | Clark et al. | |
| 6,392,618 B1 | 5/2002 | Kimura et al. | |
| 6,417,868 B1 | 7/2002 | Bock | |
| 6,433,917 B1 | 8/2002 | Mei et al. | |
| 6,438,282 B1 | 8/2002 | Takeda et al. | |
| 6,452,712 B2 | 9/2002 | Atobe et al. | |
| 6,466,354 B1 | 10/2002 | Gudeman | |
| 6,518,944 B1 | 2/2003 | Doane et al. | |
| 6,519,073 B1 | 2/2003 | Goossen | |
| 6,556,338 B2 | 4/2003 | Han et al. | |
| 6,574,033 B1 | 6/2003 | Chui et al. | |
| 6,597,490 B2 | 7/2003 | Tayebati | |
| 6,608,268 B1 | 8/2003 | Goldsmith | |
| 6,632,698 B2 | 10/2003 | Ives | |
| 6,650,455 B2 | 11/2003 | Miles | |
| 6,657,386 B2 | 12/2003 | Koshio et al. | |
| 6,657,832 B2 | 12/2003 | Williams et al. | |
| 6,661,561 B2 | 12/2003 | Fitzpatrick et al. | |
| 6,674,562 B1 | 1/2004 | Miles et al. | |
| 6,680,792 B2 | 1/2004 | Miles | |
| 6,698,295 B1 | 3/2004 | Sherrer | |
| 6,710,908 B2 | 3/2004 | Miles et al. | |
| 6,715,889 B2 | 4/2004 | Nishima et al. | |
| 6,753,937 B2 | 6/2004 | Grupp | |
| 6,778,034 B2 | 8/2004 | Nir et al. | |
| 6,784,956 B2 | 8/2004 | Matsumoto et al. | |
| 6,794,119 B2 | 9/2004 | Miles | |
| 6,813,059 B2 | 11/2004 | Hunter et al. | |
| 6,841,081 B2 | 1/2005 | Chang et al. | |
| 6,844,959 B2 | 1/2005 | Huibers et al. | |
| 6,849,471 B2 | 2/2005 | Patel et al. | |
| 6,862,127 B1 | 3/2005 | Ishii | |
| 6,867,896 B2 | 3/2005 | Miles | |
| 6,870,654 B2 | 3/2005 | Lin et al. | |
| 6,880,959 B2 | 4/2005 | Houston | |
| 6,882,458 B2 | 4/2005 | Lin et al. | |
| 6,882,461 B1 | 4/2005 | Tsai et al. | |
| 6,885,409 B2 | 4/2005 | Stephenson et al. | |
| 6,891,588 B2 | 5/2005 | Kawachi et al. | |
| 6,912,022 B2 | 6/2005 | Lin et al. | |
| 6,913,942 B2 | 7/2005 | Patel et al. | |
| 6,940,630 B2 | 9/2005 | Xie | |
| 6,947,200 B2 | 9/2005 | Huibers | |
| 6,952,303 B2 | 10/2005 | Lin et al. | |
| 6,958,847 B2 | 10/2005 | Lin | |
| 6,960,305 B2 | 11/2005 | Doan et al. | |
| 6,963,685 B2 * | 11/2005 | Mahgerefteh et al. | 385/37 |
| 6,980,350 B2 | 12/2005 | Hung et al. | |
| 6,982,820 B2 | 1/2006 | Tsai | |
| 7,006,272 B2 | 2/2006 | Tsai | |
| 7,019,809 B2 | 3/2006 | Sekiguchi | |
| 7,027,204 B2 | 4/2006 | Trisnadi et al. | |
| 7,034,981 B2 | 4/2006 | Makigaki | |
| 7,042,625 B2 | 5/2006 | Hong et al. | |
| 7,046,422 B2 | 5/2006 | Kimura et al. | |
| 7,061,678 B1 | 6/2006 | Chikazawa | |
| 7,119,945 B2 | 10/2006 | Kothari et al. | |
| 7,123,216 B1 | 10/2006 | Miles | |
| 7,126,738 B2 | 10/2006 | Miles | |
| 7,130,104 B2 | 10/2006 | Cummings | |
| 7,135,643 B2 | 11/2006 | van Haaster et al. | |
| 7,161,728 B2 | 1/2007 | Sampsell et al. | |
| 7,184,195 B2 | 2/2007 | Yang | |
| 7,184,202 B2 | 2/2007 | Miles et al. | |
| 7,198,973 B2 | 4/2007 | Lin et al. | |
| 7,205,722 B2 | 4/2007 | Koshio et al. | |
| 7,221,495 B2 | 5/2007 | Miles et al. | |
| 7,236,284 B2 | 6/2007 | Miles | |
| 7,245,285 B2 | 7/2007 | Yeh et al. | |
| 7,250,930 B2 | 7/2007 | Hoffman et al. | |

| | | |
|---|---|---|
| 7,265,809 B2 | 9/2007 | Dunn et al. |
| 7,277,143 B2 | 10/2007 | Funahata et al. |
| 7,289,259 B2 | 10/2007 | Chui et al. |
| 7,298,437 B2 | 11/2007 | Edwards et al. |
| 7,302,157 B2 | 11/2007 | Chui |
| 7,310,121 B2 | 12/2007 | Hirakata et al. |
| 7,321,456 B2 | 1/2008 | Cummings |
| 7,321,457 B2 | 1/2008 | Heald |
| 7,324,176 B2 | 1/2008 | Dunn et al. |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,403,180 B1 | 7/2008 | Silverstein et al. |
| 7,436,573 B2 | 10/2008 | Doan et al. |
| 7,459,402 B2 | 12/2008 | Doan et al. |
| 7,535,621 B2 | 5/2009 | Chiang |
| 7,566,664 B2 | 7/2009 | Yan et al. |
| 7,569,488 B2 | 8/2009 | Rafanan |
| 7,629,197 B2 | 12/2009 | Luo et al. |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0024711 A1 | 2/2002 | Miles |
| 2002/0051281 A1 | 5/2002 | Ueda et al. |
| 2002/0054424 A1 | 5/2002 | Miles |
| 2002/0067446 A1 | 6/2002 | Wang |
| 2002/0070931 A1 | 6/2002 | Ishikawa |
| 2002/0075555 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kudrle et al. |
| 2002/0149721 A1 | 10/2002 | Minoura et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0112507 A1 | 6/2003 | Divelbiss et al. |
| 2003/0119221 A1 | 6/2003 | Cunningham et al. |
| 2003/0123125 A1 | 7/2003 | Little |
| 2003/0128175 A1 | 7/2003 | Berstis |
| 2003/0138669 A1 | 7/2003 | Kojima et al. |
| 2003/0189528 A1 | 10/2003 | Antila et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0135947 A1 | 7/2004 | Jang et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0184766 A1 | 9/2004 | Kim et al. |
| 2004/0189588 A1 | 9/2004 | Dong et al. |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0069209 A1 | 3/2005 | Damera-Venkata et al. |
| 2005/0078348 A1 | 4/2005 | Lin |
| 2005/0122294 A1 | 6/2005 | Ben-David et al. |
| 2005/0168849 A1 | 8/2005 | Lin |
| 2005/0179378 A1 | 8/2005 | Oooka et al. |
| 2005/0195370 A1 | 9/2005 | Gore et al. |
| 2005/0195462 A1 | 9/2005 | Lin |
| 2005/0225686 A1 | 10/2005 | Brummack et al. |
| 2005/0249966 A1 | 11/2005 | Tung et al. |
| 2005/0253820 A1 | 11/2005 | Horiuchi |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066926 A1 | 3/2006 | Kwak et al. |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0077393 A1 | 4/2006 | Gally et al. |
| 2006/0077516 A1 | 4/2006 | Kothari |
| 2006/0079048 A1 | 4/2006 | Sampsell |
| 2006/0082863 A1 | 4/2006 | Piehl et al. |
| 2006/0091824 A1 | 5/2006 | Pate et al. |
| 2006/0220160 A1 | 10/2006 | Miles |
| 2006/0250326 A1 | 11/2006 | Wampler |
| 2006/0262126 A1 | 11/2006 | Miles |
| 2006/0262380 A1 | 11/2006 | Miles |
| 2006/0262562 A1 | 11/2006 | Fukasawa et al. |
| 2006/0268388 A1 | 11/2006 | Miles |
| 2006/0274398 A1 | 12/2006 | Chou |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0121118 A1 | 5/2007 | Gally et al. |
| 2007/0138608 A1 | 6/2007 | Ikehashi |
| 2007/0177247 A1 | 8/2007 | Miles |
| 2007/0194630 A1 | 8/2007 | Mingard et al. |
| 2007/0205969 A1 | 9/2007 | Hagood et al. |
| 2007/0216987 A1 | 9/2007 | Hagood et al. |
| 2007/0229936 A1 | 10/2007 | Miles |
| 2007/0268201 A1 | 11/2007 | Sampsell et al. |
| 2007/0268211 A1 | 11/2007 | Whitehead et al. |
| 2007/0279729 A1 | 12/2007 | Kothari et al. |
| 2007/0285761 A1 | 12/2007 | Zhong et al. |
| 2007/0290961 A1 | 12/2007 | Sampsell |
| 2008/0002299 A1 | 1/2008 | Thurn |
| 2008/0003737 A1 | 1/2008 | Tung et al. |
| 2008/0013144 A1 | 1/2008 | Chui et al. |
| 2008/0013145 A1 | 1/2008 | Chui et al. |
| 2008/0013154 A1 | 1/2008 | Chui |
| 2008/0030657 A1 | 2/2008 | Wu et al. |
| 2008/0037093 A1 | 2/2008 | Miles |

| | | | |
|---|---|---|---|
| 2008/0055705 A1 | 3/2008 | Kothari | |
| 2008/0055706 A1 | 3/2008 | Chui et al. | |
| 2008/0055707 A1 | 3/2008 | Kogut et al. | |
| 2008/0080043 A1 | 4/2008 | Chui et al. | |
| 2008/0088904 A1 | 4/2008 | Miles | |
| 2008/0088910 A1 | 4/2008 | Miles | |
| 2008/0088911 A1 | 4/2008 | Miles | |
| 2008/0088912 A1 | 4/2008 | Miles | |
| 2008/0094690 A1 | 4/2008 | Luo et al. | |
| 2008/0106782 A1 | 5/2008 | Miles | |
| 2008/0110855 A1 | 5/2008 | Cummings | |
| 2008/0112035 A1 | 5/2008 | Cummings | |
| 2008/0112036 A1 | 5/2008 | Cummings | |
| 2008/0151353 A1 | 6/2008 | Haskett | |
| 2008/0186581 A1 | 8/2008 | Bita et al. | |
| 2008/0218834 A1 | 9/2008 | Wang | |
| 2008/0239455 A1 | 10/2008 | Kogut et al. | |
| 2008/0247028 A1 | 10/2008 | Chui et al. | |
| 2008/0278787 A1 | 11/2008 | Sasagawa | |
| 2008/0278788 A1 | 11/2008 | Sasagawa | |
| 2008/0288225 A1 | 11/2008 | Djordjev | |
| 2008/0297880 A1 | 12/2008 | Steckl et al. | |
| 2008/0316566 A1 | 12/2008 | Lan | |
| 2008/0316568 A1 | 12/2008 | Griffiths et al. | |
| 2009/0009845 A1 | 1/2009 | Endisch et al. | |
| 2009/0068781 A1 | 3/2009 | Tung et al. | |
| 2009/0080060 A1 | 3/2009 | Sampsell et al. | |
| 2009/0103168 A1 | 4/2009 | Sampsell | |
| 2009/0135465 A1 | 5/2009 | Chui | |
| 2009/0201566 A1 | 8/2009 | Kothari | |
| 2009/0213450 A1 | 8/2009 | Sampsell | |
| 2009/0213451 A1 | 8/2009 | Tung et al. | |
| 2009/0256218 A1 | 10/2009 | Mignard et al. | |
| 2009/0273823 A1 | 11/2009 | Tung et al. | |
| 2009/0273824 A1 | 11/2009 | Sasagawa | |
| 2009/0279162 A1 | 11/2009 | Chui | |
| 2010/0039370 A1 | 2/2010 | Miles | |
| 2010/0080890 A1 | 4/2010 | Tung et al. | |
| 2010/0085626 A1 | 4/2010 | Tung et al. | |
| 2010/0118382 A1 | 5/2010 | Kothari et al. | |

FOREIGN PATENT DOCUMENTS

| | | |
|---|---|---|
| EP | 0 668 490 | 8/1995 |
| EP | 1 030 340 | 8/2000 |
| EP | 1 122 577 | 8/2001 |
| EP | 1 227 346 | 7/2002 |
| EP | 1 275 997 | 1/2003 |
| EP | 1 439 515 | 7/2004 |
| EP | 1 473 581 | 11/2004 |
| EP | 1 640 777 | 3/2006 |
| EP | 1 847 864 | 10/2007 |
| JP | 04-309925 | 2/1992 |
| JP | 5-49238 | 2/1993 |
| JP | 5-281479 | 10/1993 |
| JP | 11211999 | 8/1999 |
| JP | 2002-062490 | 2/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| WO | WO 94/22045 | 9/1994 |
| WO | WO 98/14804 | 4/1998 |
| WO | WO 02/086582 | 10/2002 |
| WO | WO 03/105198 | 12/2003 |
| WO | WO 2004/042687 | 5/2004 |
| WO | WO 2005/010566 | 2/2005 |
| WO | WO 2007/036422 | 4/2007 |
| WO | WO 2007/053438 | 5/2007 |
| WO | WO 2007/072998 | 6/2007 |

OTHER PUBLICATIONS

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Invitation to Pay Additional Fees dated Dec. 18, 2008 in PCT/US08/076074.

International Search Report and Written Opinion for International Application No. PCT/US2008/076074, mailed March 25, 2009.

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23, (1994).

Conner, "Hybrid Color Display Using Optical Interference Filter Array," SID Digest, pp. 577-580 (1993).

Feenstra et al., Electrowetting displays, Liquivista BV, 16 pp., Jan. 2006.

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, June 24-27, 1991, Proceedings on the Int'l. Conf. on Solid State Sensors and Actuators, vol. Conf. 6, June 24, 1991, pp. 372-375.

Lezec, Submicrometer dimple array based interference color field displays and sensors, Nano Lett. 7(2):329-333, Dec. 23, 2006.

Miles, Mark, W., "A New Reflective FPD Technology Using Interferometric Modulation", The Proceedings of the Society for Information Display (May 11-16, 1997).

Taii et al., "A transparent sheet display by plastic MEMS," Journal of the SID 14(8):735-741, 2006.

Longhurst, 1963, Chapter IX: Multiple Beam Interferometry, in Geometrical and Physical Optics, pp. 153-157.

Tolansky, 1948, Chapter II: Multiple-Beam Interference, in Multiple-bean Interferometry of Surfaces and Films, Oxford at the Clarendon Press, pp. 8-11.

IPRP dated Mar. 25, 2010 in PCT/US08/076074.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

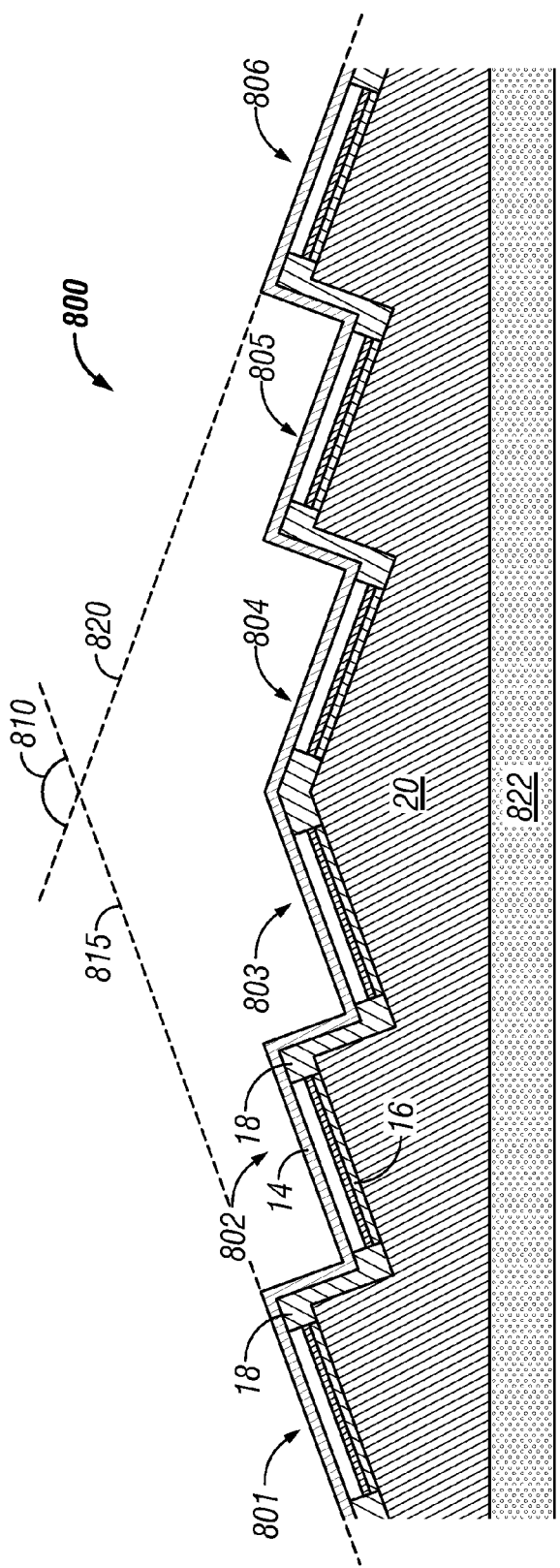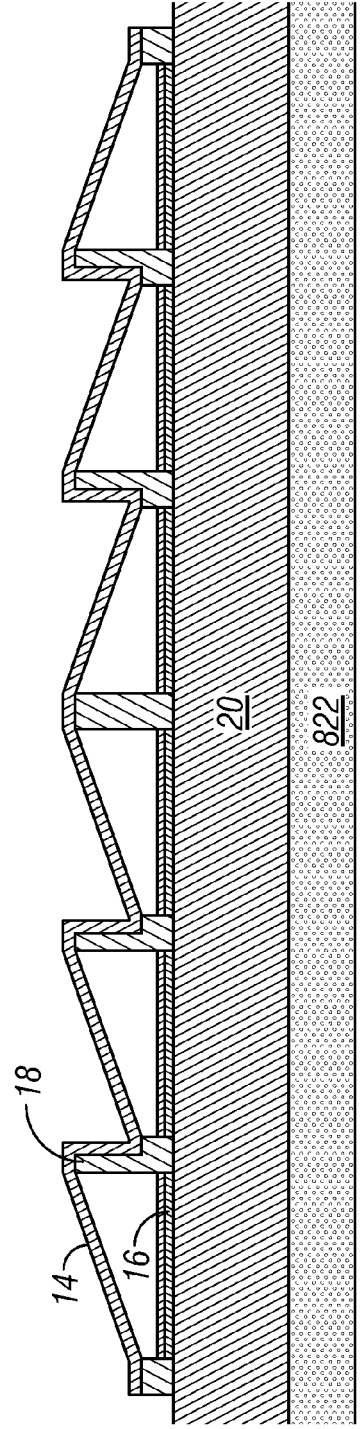
FIG. 8A
FIG. 8B

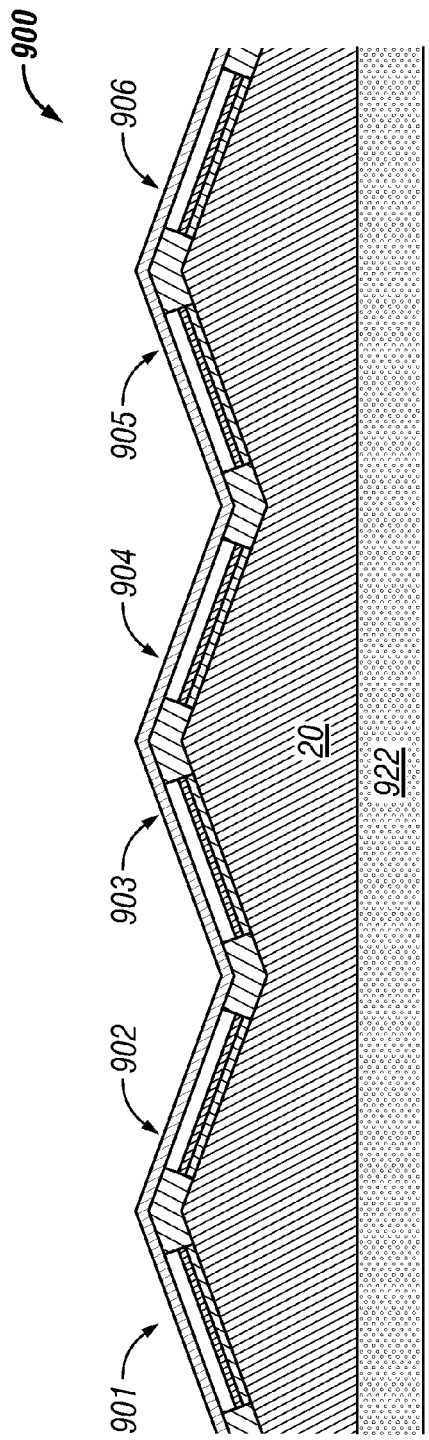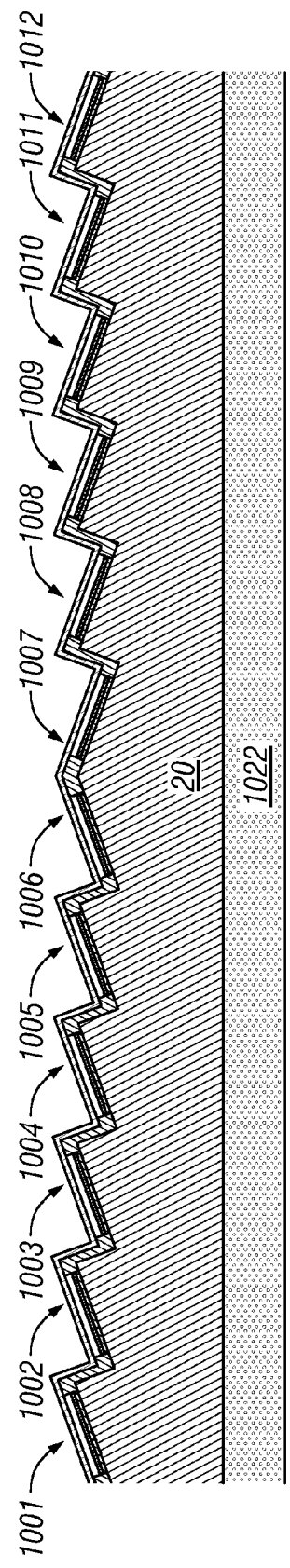

US 7,847,999 B2

INTERFEROMETRIC MODULATOR DISPLAY DEVICES

CROSS-REFERENCE TO RELATED APPLICATIONS

This application claims the benefit under 35 U.S.C. §119(e) of U.S. Provisional Patent Application No. 60/972,717, filed Sep. 14, 2007, entitled "INTERFEROMETRIC MODULATOR DISPLAY DEVICES," which is hereby incorporated by reference herein in its entirety.

BACKGROUND

1. Field

The field of the disclosure relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

An embodiment of a pixel for a display device on a substrate is disclosed. The pixel comprises a first interferometric modulator on the substrate. The first interferometric modulator has a first normal direction substantially perpendicular to the first interferometric modulator and a first angularly-dependent reflectivity function that comprises a first reflectivity in a first direction and a second reflectivity in a second direction. The first reflectivity may be greater than the second reflectivity. The pixel also comprises a second interferometric modulator on the substrate. The second interferometric modulator has a second normal direction substantially perpendicular to the second interferometric modulator and a second angularly-dependent reflectivity function that comprises a third reflectivity in the second direction and a fourth reflectivity in the first direction. The third reflectivity may be greater than the fourth reflectivity.

An embodiment of a display device comprising a plurality of pixels on a substrate is disclosed. Each pixel of the plurality of pixels comprises a first interferometric modulator on the substrate and a second interferometric modulator on the substrate. The first interferometric modulator has a first normal direction substantially perpendicular to the first interferometric modulator and a first angularly-dependent reflectivity function that comprises a first reflectivity in a first direction and a second reflectivity in a second direction. The first reflectivity is greater than the second reflectivity. The second interferometric modulator has a second normal direction substantially perpendicular to the second interferometric modulator and a second angularly-dependent reflectivity function that comprises a third reflectivity in the second direction and a fourth reflectivity in the first direction. The third reflectivity may be greater than the fourth reflectivity.

An embodiment of a display device comprising a plurality of pixels on a substrate is disclosed. Each pixel of the plurality of pixels comprises a first interferometric modulator on the substrate and a second interferometric modulator on the substrate. The first interferometric modulator has, in a first wavelength range, a first angularly-dependent reflectivity function that comprises a first reflectivity in a first direction and a second reflectivity in a second direction. The first reflectivity may be greater than the second reflectivity. The second interferometric modulator has, in a second wavelength range, a second angularly-dependent reflectivity function that comprises a third reflectivity in the first direction and a fourth reflectivity in the second direction. The third reflectivity may be greater than the fourth reflectivity. In certain embodiments, the first reflectivity is substantially the same as the third reflectivity, and the second reflectivity is substantially the same as the fourth reflectivity.

An embodiment of a method of making a display device is provided. The method comprises selecting a first angular range relative to a substrate and forming a first interferometric modulator on the substrate. The first interferometric modulator comprises two or more at least partially reflective layers separated by a first distance when the first interferometric modulator is in an unactuated state. The first interferometric modulator is oriented at a nonzero first tilt angle with respect to the substrate, and the first interferometric modulator has a first angularly-dependent reflectivity function. The method further comprises selecting the first distance such that the first angularly-dependent reflectivity function is substantially greater than zero in the first angular range and selecting the first tilt angle based at least in part on the first angularly-dependent reflectivity function in the first angular range.

An embodiment of a pixel for a display device is provided. The pixel comprises a first means for interferometrically modulating light and a second means for interferometrically modulating light. The first modulating means is formed on a substrate, and the first modulating means has a first normal direction substantially perpendicular to the first modulating means and has a first angularly-dependent reflectivity function that comprises a first reflectivity in a first direction and a second reflectivity in a second direction. The first reflectivity may be greater than the second reflectivity. The second modulating means is formed on the substrate, and the second modulating means has a second normal direction substantially perpendicular to the second modulating means and has a second angularly-dependent reflectivity function that comprises a third reflectivity in the second direction and a fourth reflectivity in the first direction. The third reflectivity may be greater than the fourth reflectivity.

BRIEF DESCRIPTION OF THE DRAWINGS

FIG. 8A is a side view of one embodiment of an interferometric modulator array configured such that the interferometric modulators are inclined with respect to the general plane of a substrate.

FIG. 8B is a side view of one embodiment of an interferometric modulator array configured such that the movable layers of the interferometric modulators are inclined with respect to the general plane of the substrate.

FIG. 9 is a side view of another embodiment of an interferometric modulator array with a different arrangement of colors and pixels.

FIG. 10 is a side view of still another embodiment of an interferometric modulator array with a different arrangement of colors and pixels.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

When light having a narrow range of wavelengths is incident on certain embodiments of interferometric modulators, the reflectivity of the interferometric modulator can vary substantially with viewing angle. Accordingly, a pixel comprising such an interferometric modulator will appear relatively bright when viewed from a first direction and relatively dark when viewed from a second direction. A display device comprising an array of pixels can be configured so that a portion of the array displays a first image in the first direction (and appears dark in the second direction) while a complimentary portion of the array displays a second image in the second direction (and appears dark in the first direction). By positioning the display device so that the two directions correspond to the two eyes of an observer, the observer's first eye will see the first image and the observer's second eye will see the second image. If the first and the second image are related stereoscopically, the observer will perceive a depth-dependent, three-dimensional image. Embodiments of the display device can be configured to display monochromatic or color images.

Figure 1:
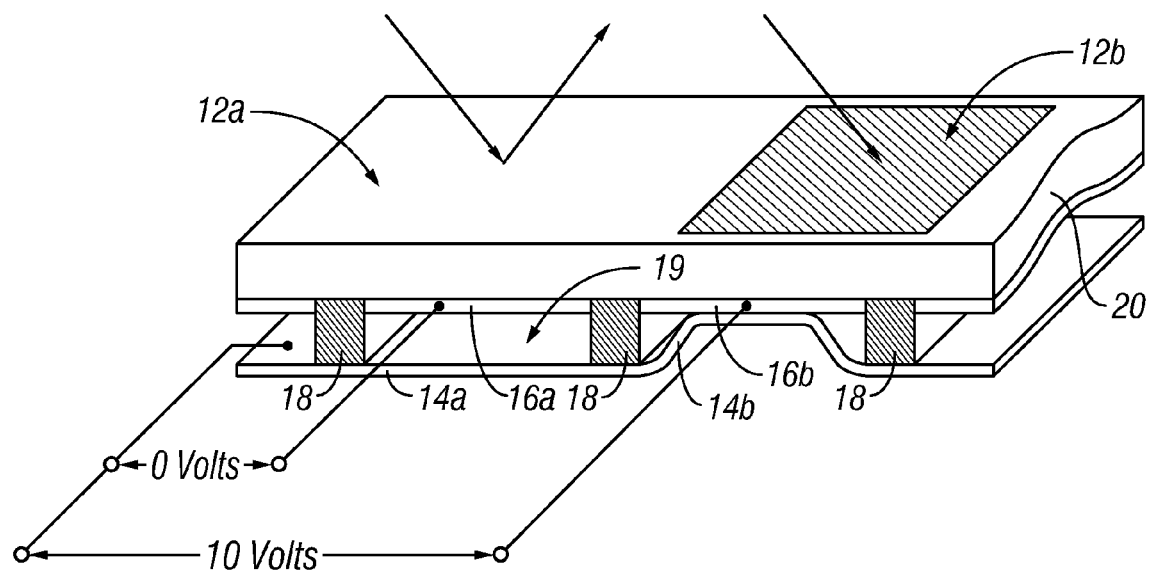
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
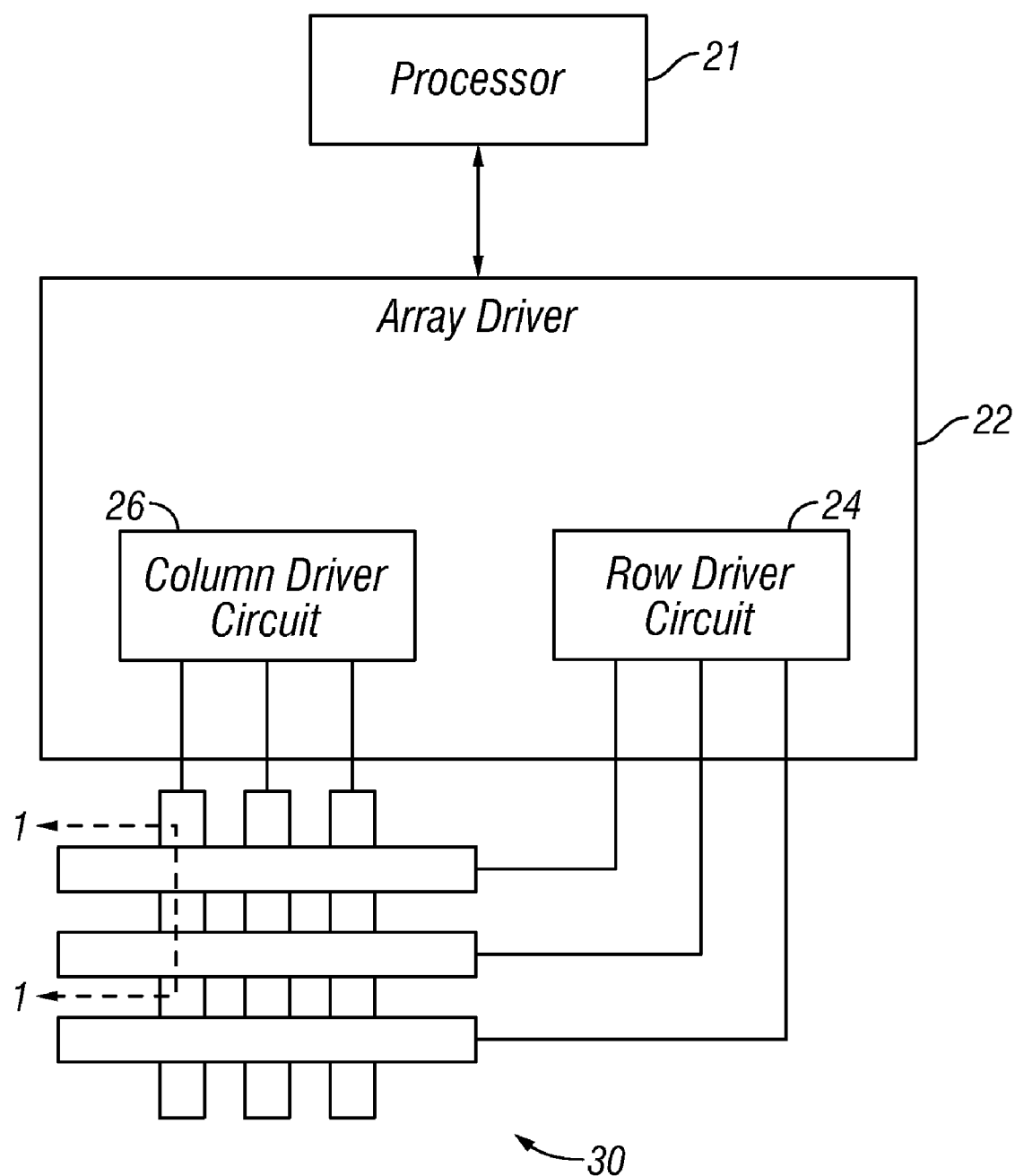
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
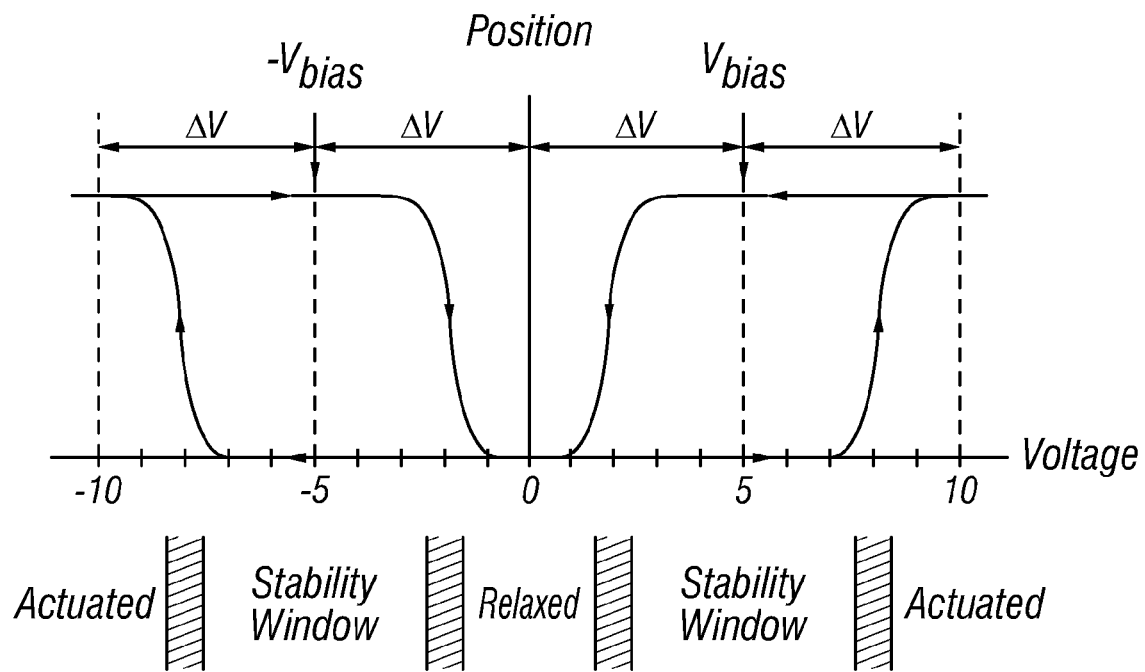
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
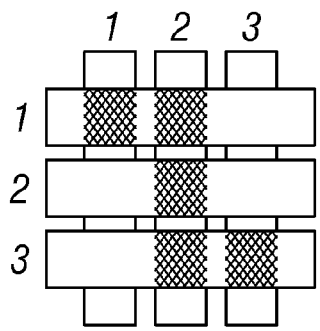
FIG. 5A illustrates one exemplary frame of display data in the 3×3 interferometric modulator display of FIG. 2.
Figure 5B:
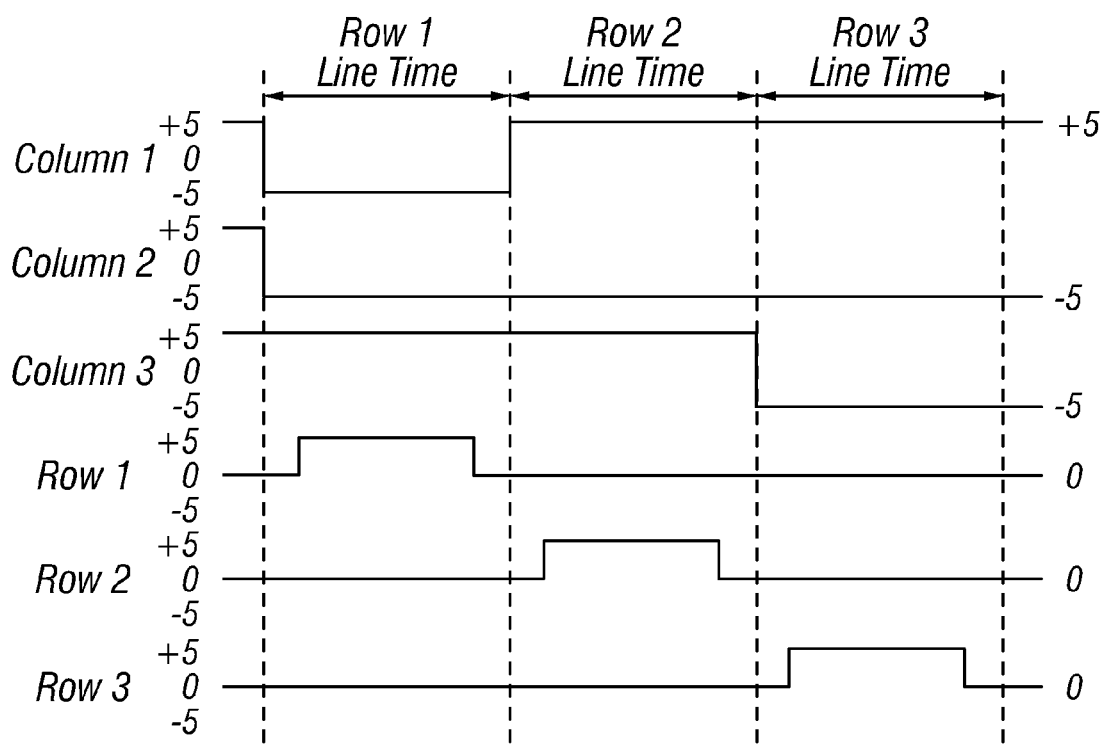
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
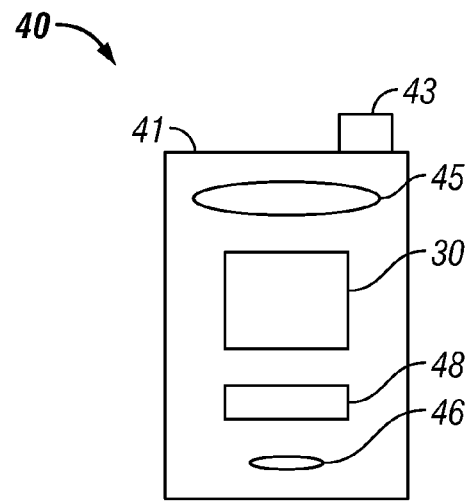
FIGS. 6A and 6B are system block diagrams illustrating an embodiment of a visual display device comprising a plurality of interferometric modulators.
Figure 6B:
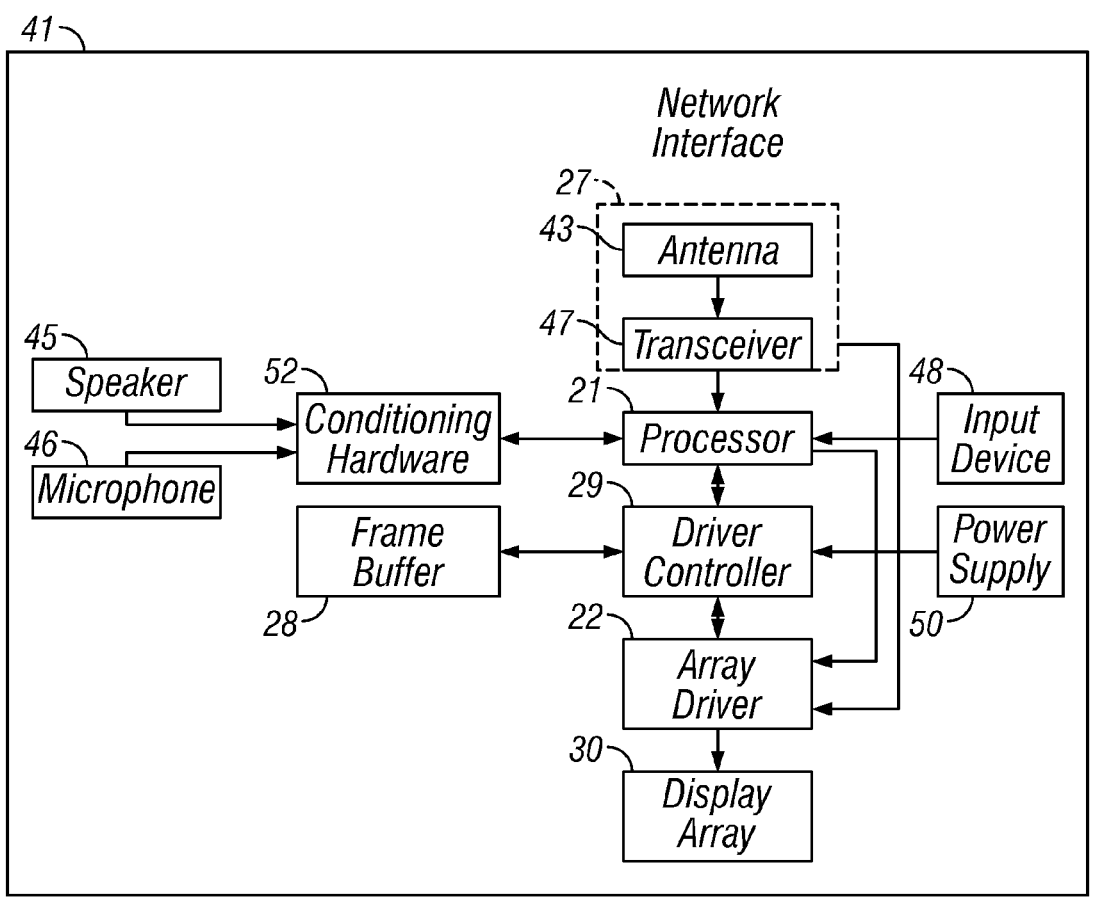

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
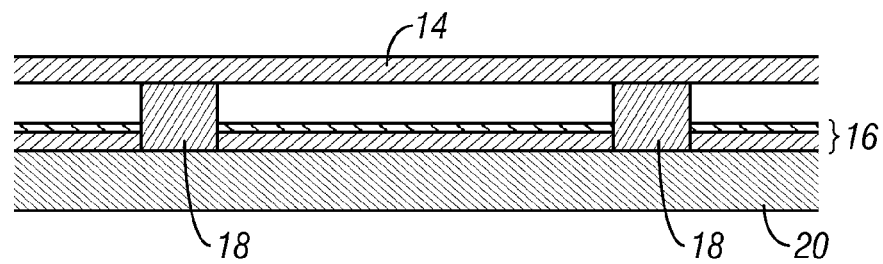
FIG. 7A is a cross section of the device of FIG. 1.
Figure 7B:
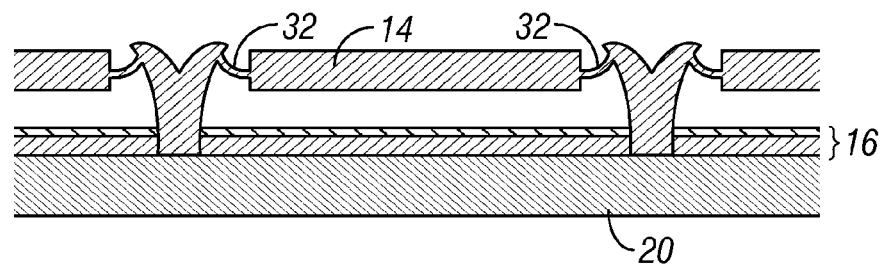
FIG. 7B is a cross section of an alternative embodiment of an interferometric modulator.
Figure 7C:
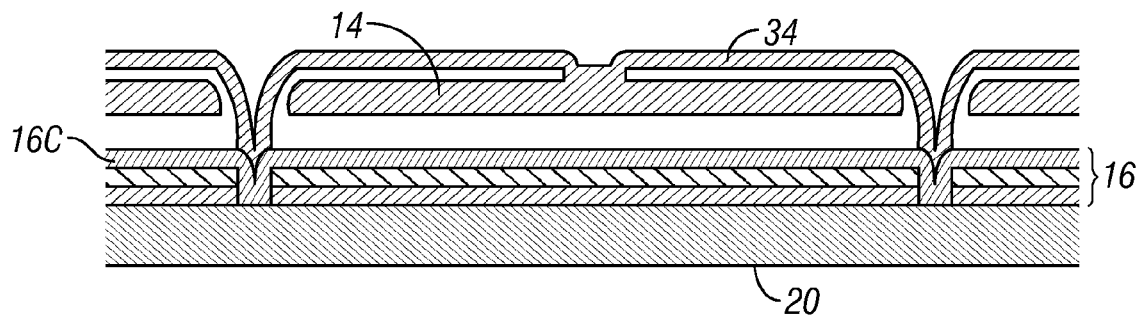
FIG. 7C is a cross section of another alternative embodiment of an interferometric modulator.
Figure 7D:
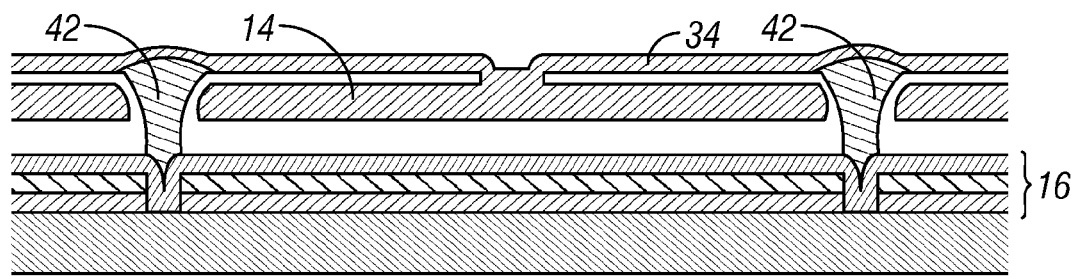
FIG. 7D is a cross section of yet another alternative embodiment of an interferometric modulator.
Figure 7E:
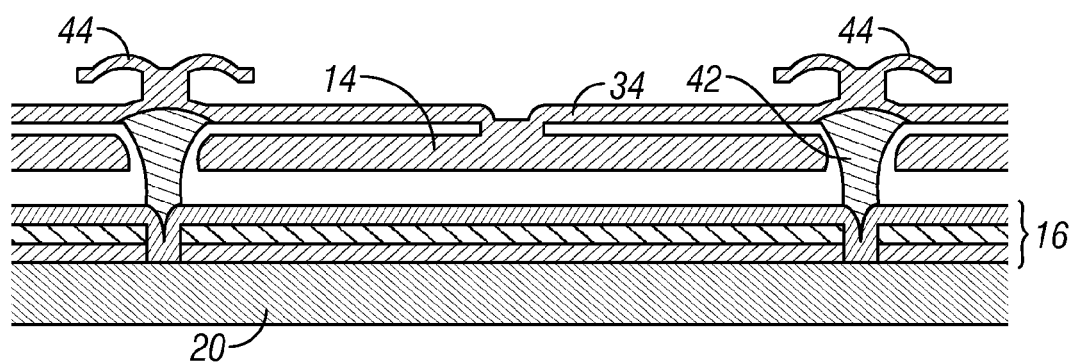
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

FIGS. 7A-7E schematically illustrate embodiments of interferometric modulators in which the substrate 20, the optical stack 16, and the movable reflective layer 14 are substantially parallel. In alternate embodiments, one or more of these elements may be fabricated so as to not be substantially parallel to the others to achieve advantageous effects, as further described.

In certain embodiments, devices comprising interferometric modulators may be used for providing three-dimensional displays. One embodiment comprises a system for displaying to an observer a stereoscopic image comprising pixels formed on a single substrate, wherein each pixel comprises at least a first interferometric modulator, and wherein the system is configured to display a first image to a first eye of the observer and to display a second image to a second eye of the observer. Directional display of the two portions of the stereoscopic image is implemented by fashioning two sets of interferometric modulators, one set inclined at a first angle with respect to the substrate, and the second set inclined at a second angle with respect to the substrate. In another embodiment, a display device includes an array of elements, on which images are displayed. When these elements are configured properly, multiple images may be displayed to an observer simultaneously. Each image may be shown in a separate direction. The device may be configured to display two images having a stereoscopic relationship, such that when one image is shown to one eye and the other image is shown to the other eye, the display is perceived to be three-dimensional by the observer. In other embodiments multiple images are displayed simultaneously such that an observer moving relative to the device sees a sequence of images.

FIG. 8A shows an array of such an alternative embodiment. In this embodiment of an interferometric modulator, an optical stack 16 and the corresponding reflective layer 14 are substantially parallel to each other, but not to a general plane of the substrate 20. The general plane in a region of a MEMS device including interferometric modulators 801-806 is schematically represented in FIG. 8A as a line 836. The general plane is substantially parallel to the substrate 20 over a distance scale that may include, for example, tens to hundreds of interferometric modulators. The distance scale may be about 1 mm in some embodiments. In embodiments of MEMS devices where the substrate 20 has a generally curved shape over larger distance scales (e.g., one or more centimeters), the general plane may vary in direction across the device. For example, the general plane at any location in the substrate 20 may represent a plane that is substantially tangent to the substrate 20 at that location.

In the embodiment shown in FIG. 8A, each reflective layer 14 and its corresponding optical stack 16 are inclined at one of two angles from the general plane of the substrate 20. Two sets of interferometric modulators 801-803 in a first set, and 804-806 in a second set are shown, each positioned in a direction substantially parallel to the others within its set, but not to the general plane of the substrate 20 and not to interferometric modulators of the other set. The effect of these two sets is that incident light is reflected in two different directions. The first and second sets can be positioned relative to each other such that an angle 810 formed by the intersection of a first line 815 parallel to the plane of the interferometric modulator 801, and a second line 820 parallel to the plane of the interferometric modulator 806, is greater than zero and less than 180 degrees. For example, in some embodiments, one or more sets are positioned such that the angle 810 is less than 5 degrees, equal to or between (in degrees) 5-10, 10-15, 15-20, 20-25, 25-30, 30-35, 35-40, 40-45, 45-50, 50-55, 55-60, 60-65, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, 175-179, or less than 180 degrees.

In the embodiment shown in FIG. 8A each of these sets forms a pixel. For a color display each pixel may have three colors, one interferometric modulator each for red, green, and blue ("RGB"), for example. For a two color display, e.g., black and white, each set can be a grey scale pixel with, for example, eight brightness levels.

The array may also be produced with interferometric modulators of an embodiment wherein the optical stack 16 and the general plane of the substrate 20 are substantially parallel to each other, but not to the corresponding reflective layer 14, as shown in FIG. 8B. This embodiment has similar geometric characteristics as the embodiment of FIG. 8A with respect to light reflection, and therefore also directs light in two different directions. The color qualities of the reflected light, however, are different because of the altered geometry of the interferometric cavities. For example, the light reflected from the embodiment schematically illustrated in FIG. 8B can have a broader spectrum than the light reflected from the embodiment schematically illustrated in FIG. 8A.

Other embodiments may have interferometric modulators with the reflective layer 14 and the general plane of the substrate 20 being substantially parallel to each other, but not to the corresponding optical stack 16. This embodiment has similar light directing characteristics and color qualities as the embodiment shown in FIG. 8B.

FIG. 9 shows an interferometric modulator array 900 configured according to an alternative embodiment, wherein the interferometric modulators have a different arrangement than that of FIGS. 8A and 8B. The interferometric modulators of FIGS. 8A and 8B are arranged such that individual interferometric modulators within a single pixel are adjacent. The interferometric modulators of the embodiment of FIG. 9 are arranged such that interferometric modulators configured to reflect a certain color within a first pixel directing light to a first direction are adjacent to interferometric modulators configured to reflect the same color within a second pixel directing light to a second direction. Accordingly, in one embodiment interferometric modulator 901 displays a red color of a first pixel, interferometric modulator 902 displays a red color of a second pixel, interferometric modulator 903 displays a green color of the first pixel, interferometric modulator 904 displays a green color of the second pixel, interferometric modulator 905 displays a blue color of the first pixel, and interferometric modulator 906 displays a blue color of the second pixel, where the first pixel directs light to a first direction and the second pixel directs light to a second direction. In other embodiments the order of the colors may be different, or the arrangement of the first and second pixels may be different. In some embodiments the two pixels are corresponding pixels within a stereoscopic image.

FIG. 10 shows an embodiment configured with another arrangement of interferometric modulators. In the embodiment of FIG. 10, the interferometric modulators 1001-1012 are arranged such that interferometric modulators 1001-1006 are configured to direct light in a first direction and interferometric modulators 1007-1012 are configured to direct light in a second direction. In this embodiment multiple pixels directing light in the same direction are adjacent.

The general structure of the interferometric modulators illustrated in FIGS. 8A-10 is chosen to be similar to that shown in FIG. 7A for illustrative purposes only. The principles discussed herein will apply to other interferometric modulator structures as well. Other embodiments of modulators which can be configured with inclined mirrors are described in U.S. Pat. No. 5,986,796, entitled "Visible Spectrum Modulator Arrays," U.S. Pat. No. 6,055,090, entitled "Interferometric Modulation," and U.S. Pat. No. 7,161,728, entitled "Area Array Modulation and Lead Reduction in Interferometric Modulators," all of which are incorporated by reference herein in their entirety. In various embodiments, there can be numerous sets of interferometric modulators that are positioned adjacent and substantially parallel to each other. The relative angle between the interferometric modulators of pixels directing light in a first direction and the interferometric modulators of pixels directing light in a second direction can vary.

Figure 11:
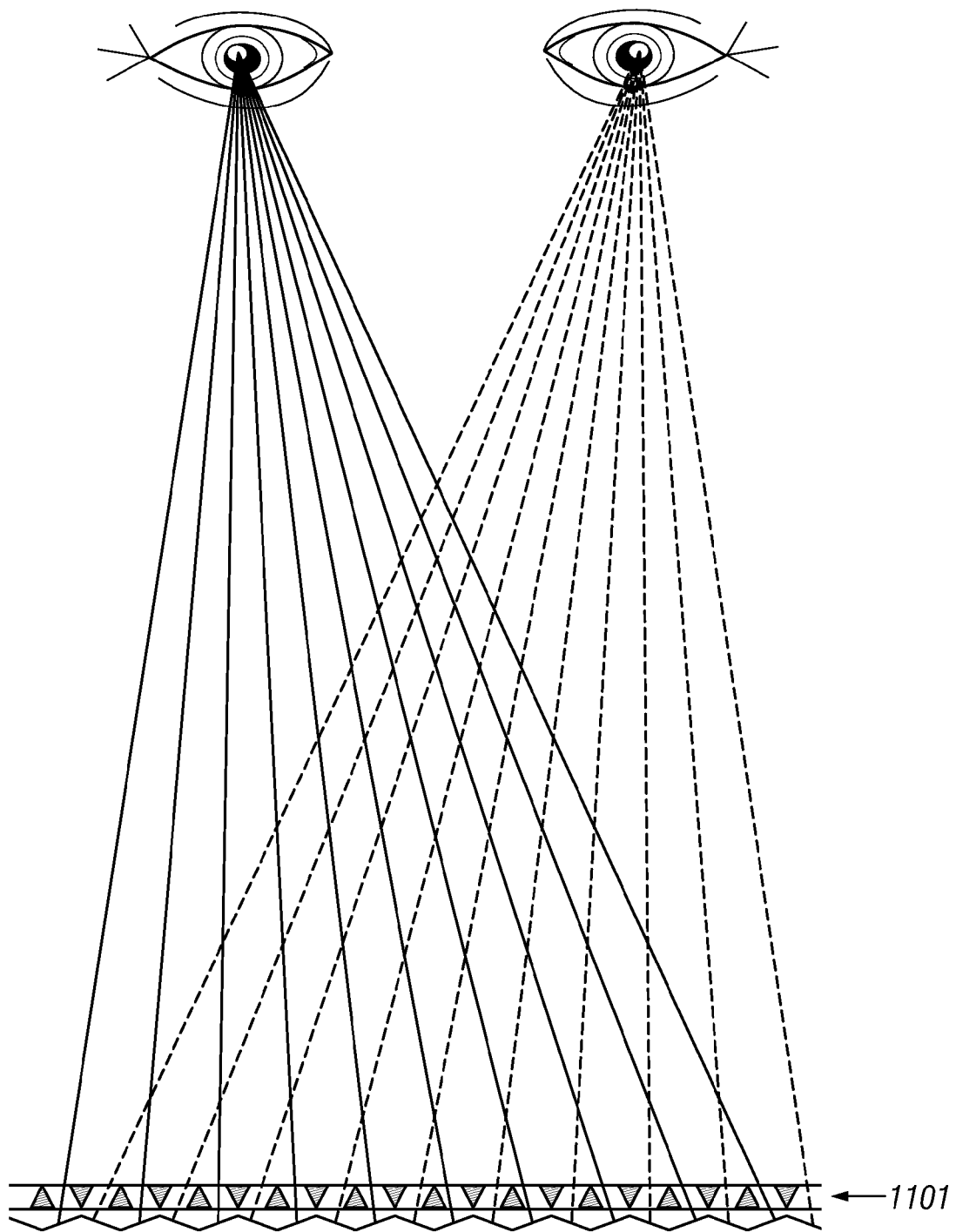
FIG. 11 is an illustration of separate images being directed to individual eyes.

An interferometric modulator array configured with inclined mirrors can be used to form a display for viewing images which appear three-dimensional. The light from interferometric modulators inclined at one angle can be presented to one eye and the light from interferometric modulators inclined at a second angle can be presented to the other eye to display stereoscopic images appearing three-dimensional to a viewer. The amount of angle required to achieve this effect depends on the desired viewing distance of the display. For example, if the viewing distance to a display is very short, the angle of the mirrors can be greater than the angle for a display that is viewed at a farther distance. In some embodiments it may be advantageous to obstruct certain light paths which would otherwise cause an image intended for one eye to appear at the other. An embodiment of such an obstruction layer is show as layer 1101 in FIG. 11. In some embodiments the positions of the obstructions may be dynamically controlled based on user inputs or inputs from device electronics configured to sense light and geometric attributes of the environment, such as relative strength and position of light sources relative to the device, and distances and angles to and between an observer's eyes. In certain embodiments, a substantially diffusive layer is included between the interferometric modulators and the incident light and/or the observer. Certain such embodiments advantageously may have an increased viewing angle from the perspective of the observer. Examples of such a diffusive layer are shown in FIGS. 8A and 8B as layer 822, FIG. 9 as layer 922, and FIG. 10 as layer 1022. The desired degree of diffusiveness or haze of the layer depends on intended spatial resolution and thickness of the substrate 20.

An interferometric modulator array configured with inclined mirrors can also be used to display a plurality of images, wherein the image seen by a viewer of the array depends on the angle from which the array is viewed. In one embodiment an array has interferometric modulators inclined at, for example, four different angles, and therefore produces four different images. An observer moving in a particular direction relative to such an array can sequentially see each of the images. In some embodiments at least some of the images are related such that when seen sequentially they produce a coordinated display, such as a text message or an animated advertisement.

As described above with reference to FIG. 1, the visible light reflectivity of some embodiments of interferometric modulators may be changed from a reflective state to a non-reflective state, for example, by moving the reflective layer 14 from the unactuated state to the actuated state. In a given state, the reflectivity of the device may also vary as a function of the angle of incidence between a viewing direction and a normal direction to the interferometric modulator. For example, when substantially monochromatic light having a relatively narrow range of wavelengths is incident on or reflected from such an interferometric modulator, constructive and destructive interference of the light can cause a substantial variation of the reflectivity as a function of viewing angle. The reflectivity of a particular interferometric modulator may also be a function of the wavelength range of the light incident on or reflected from the modulator, as well as the width of the gap 19 between the reflective layer 14 and the optical stack 16.

Figure 12:
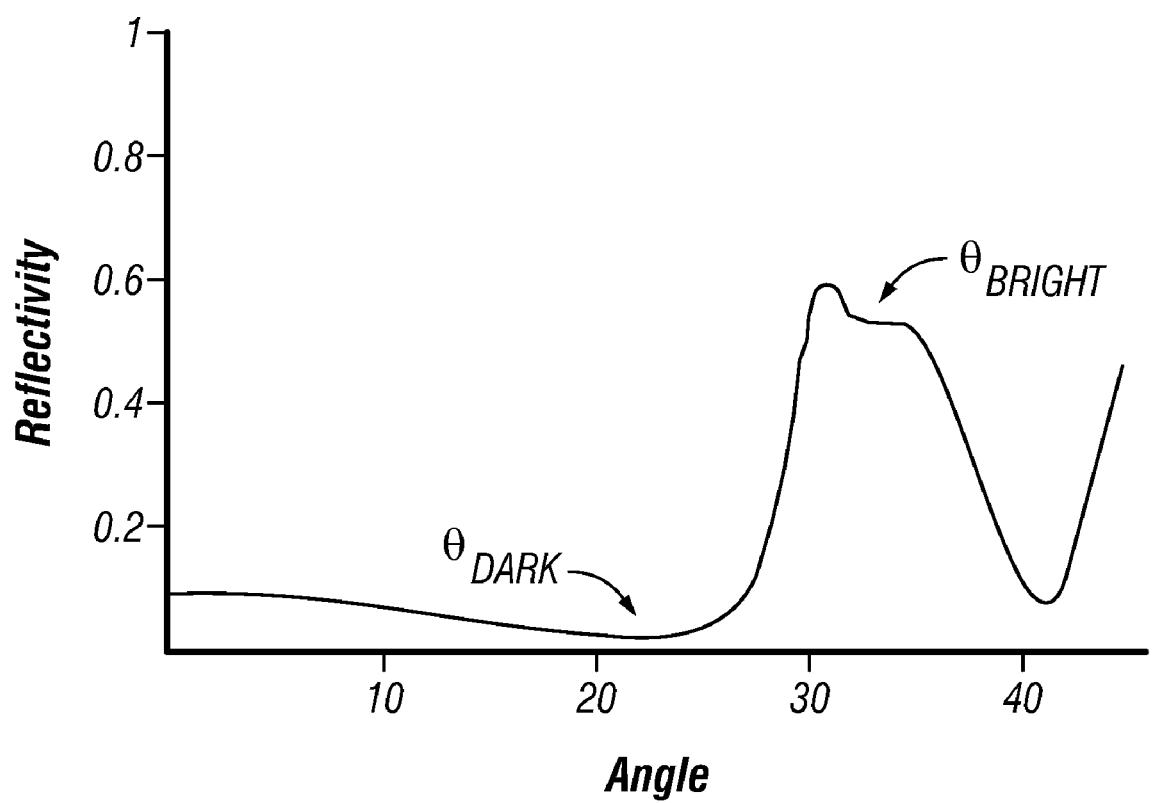
FIG. 12 is a graph of an example angularly-dependent reflectivity function for green light (550 nm) incident on an embodiment of an interferometric modulator having a gap width of about 350 nm.

FIG. 12 is a graph of an example angularly-dependent reflectivity function for an embodiment of an interferometric modulator having a gap width of about 350 nm. In this example, diffuse light in a range of wavelengths around 550 nm (e.g., green light) is incident on an embodiment of an interferometric modulator generally similar to the modulators shown in FIGS. 1 and 7A. The graph depicts the intensity of the reflected light (averaged over the two independent polarizations) as a function of viewing angle $\theta$, measured in degrees from the normal direction to the interferometric modulator. FIG. 12 shows that the angularly-dependent reflectivity function is relatively large (e.g., greater than about 10%) in a region of high reflectivity at a viewing angle near about 34 degrees. This region of high reflectivity is not at normal incidence (0 degrees), as might be expected. Instead, the region of high reflectivity spans a relatively narrow range of viewing angles and has a full-width at half-maximum of about 8 degrees. The angularly-dependent reflectivity function also has a region of low reflectivity for viewing angles near about 22 degrees.

The ratio of the maximum reflectivity in the region of high reflectivity to the minimum reflectivity in the region of low reflectivity (a contrast ratio) may be large. For example, in the example shown in FIG. 12, the contrast ratio is above 20. Accordingly, when viewed in green light, this example interferometric modulator will appear relatively bright when viewed at angles in the region of high reflectivity and will appear relatively dark when viewed at angles in the region of low reflectivity.

FIG. 12 schematically depicts a "bright angle" $\theta_{bright}$ that is selected to be representative of the region of high reflectivity and a "dark angle" $\theta_{dark}$ that is selected to be representative of the region of low reflectivity. The angles $\theta_{bright}$ and $\theta_{dark}$ may be selected according to any of a variety of statistical criteria. For example, the angle $\theta_{bright}$ may be selected as the angle at which the angularly-dependent reflectivity function is a maximum in the high reflectivity region, and the angle $\theta_{dark}$ may be selected as the angle at with this function is a minimum in the low reflectivity region. Alternatively, the angles $\theta_{bright}$ and $\theta_{dark}$ may be selected as an average or a median angle in the high and low reflectivity regions, respectively. In the example shown in FIG. 12, the bright angle $\theta_{bright} \approx 34$ degrees is selected to be an average angle in the high reflectivity region, and the dark angle $\theta_{dark} \approx 22$ degrees is selected to be the angle where the low reflectivity region has a minimum reflectivity.

Figure 13A:
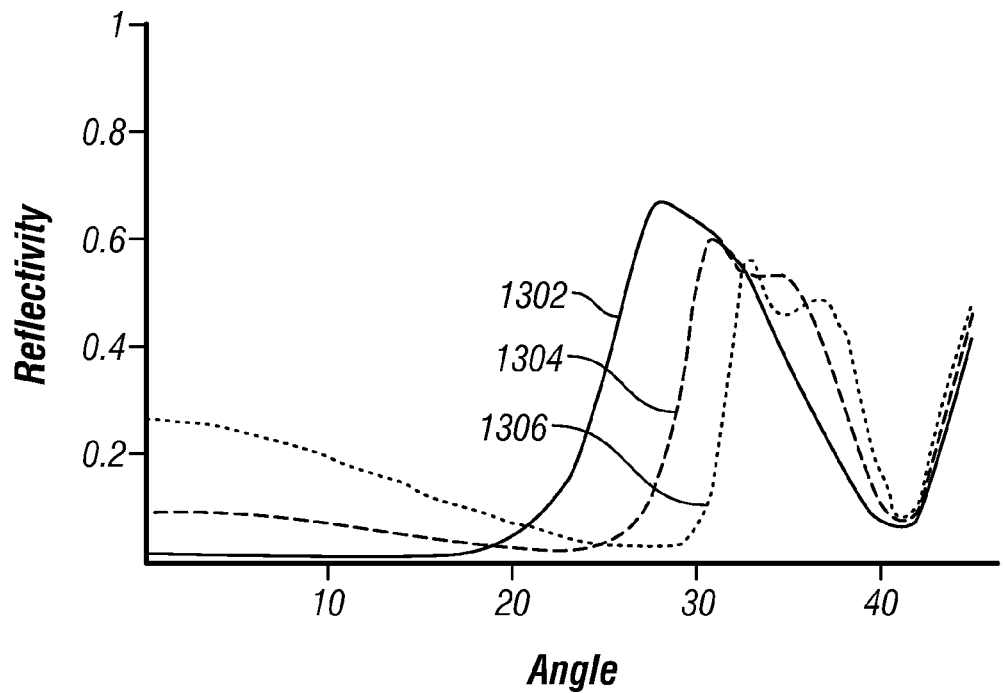
FIG. 13A is a graph of the angularly-dependent reflectivity function for green light (550 nm) incident on an example interferometric modulator having a gap width of 300 nm (solid curve), 350 nm (dashed curve), and 400 nm (dotted curve).
Figure 13B:
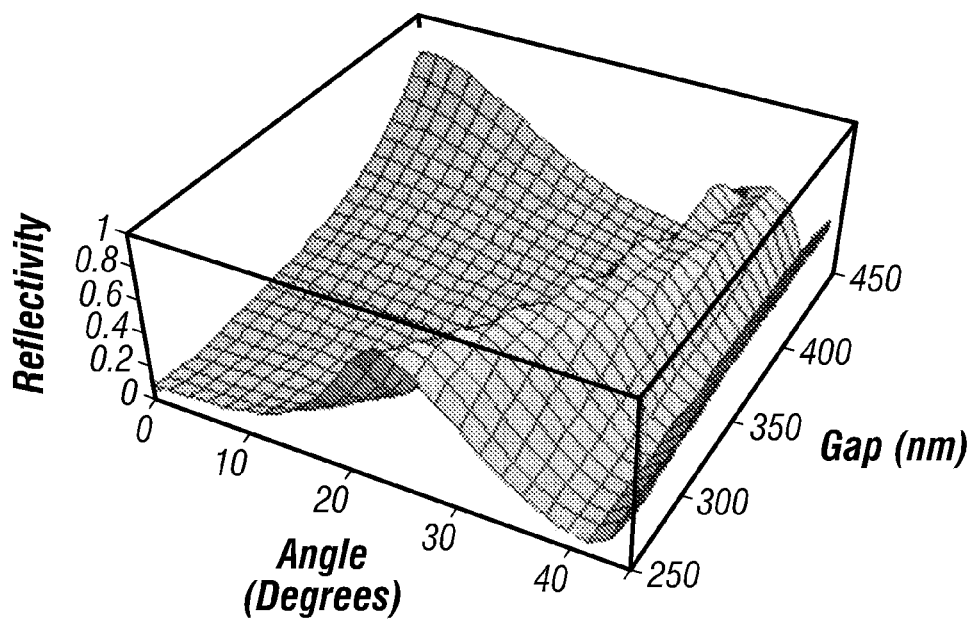
FIG. 13B is a three-dimensional surface plot showing the angularly-dependent reflectivity function for an example interferometric modulator as a function of viewing angle for gap widths ranging from 250 nm to 450 nm.

The angularly-dependent reflectivity function of an interferometric modulator may also depend on the width of the gap between the moveable reflective element 14 and the optical stack 16. FIG. 13A is a graph showing examples of the angularly-dependent reflectivity function for green light (550 nm) incident on an example interferometric modulator having three different gap widths. Solid curve 1302 is for a gap width of 300 nm and dotted curve 1306 is for a gap width of 400 nm. For comparison, the reflectivity function shown in FIG. 12 is shown as dashed curve 1304 (gap width 350 nm). FIG. 13B is a three-dimensional surface plot showing the angularly-dependent reflectivity function of this example interferometric modulator as a function of viewing angle for gap widths ranging from 250 nm to 450 nm. As with FIGS. 12 and 13A, the reflectivity in green light (550 nm) is shown in FIG. 13B. FIGS. 13A and 13B show that as the gap width of this example modulator decreases, the maximum reflectivity in the high reflectivity region increases, and the bright angle $\theta_{bright}$ and the dark angle $\theta_{dark}$ decrease. FIG. 13B also shows that the bright angle $\theta_{bright}$ is larger than the dark angle $\theta_{dark}$ for all the depicted gap widths.

Although FIGS. 12-13B illustrate the reflectivity in green light for an example interferometric modulator, the angularly-dependent reflectivity function may be determined for light in any wavelength range such as, for example, red light or blue light. Additionally, the angularly-dependent reflectivity functions shown in FIGS. 12-13B are intended to illustrate examples of the variation in reflectivity (as a function of angle and/or gap width) that are exhibited by a particular interferometric modulator embodiment and are not intended to be limiting. The magnitude and shape of the angularly-dependent reflectivity function, and the bright and dark angles representative of the high and low reflectivity regions, may be different for other interferometric modulators.

The angular variation of the reflectivity of certain embodiments of interferometric modulators advantageously may be used to provide display devices having desirable optical properties including, for example, stereoscopic three-dimensional (3-D) images. For example, a display device may comprise pixels that include one or more interferometric modulators having a substantial angular variation in reflectivity. In certain embodiments, a portion of the pixels of the display device are configured to display a high brightness image in a first direction (e.g., to a first eye of the observer) and a low brightness image in a second direction (e.g., to a second eye of the observer). A complimentary portion of the pixels are configured to display a high brightness image in the second direction and a low brightness image in the first direction. Accordingly, each eye of the observer receives a (slightly) different image from the display device, and the image may be perceived by the observer to be three-dimensional. As will be further described, both monochromatic and color stereoscopic 3-D displays can be provided by suitably positioning and orienting interferometric modulators on a display substrate.

Figure 14:
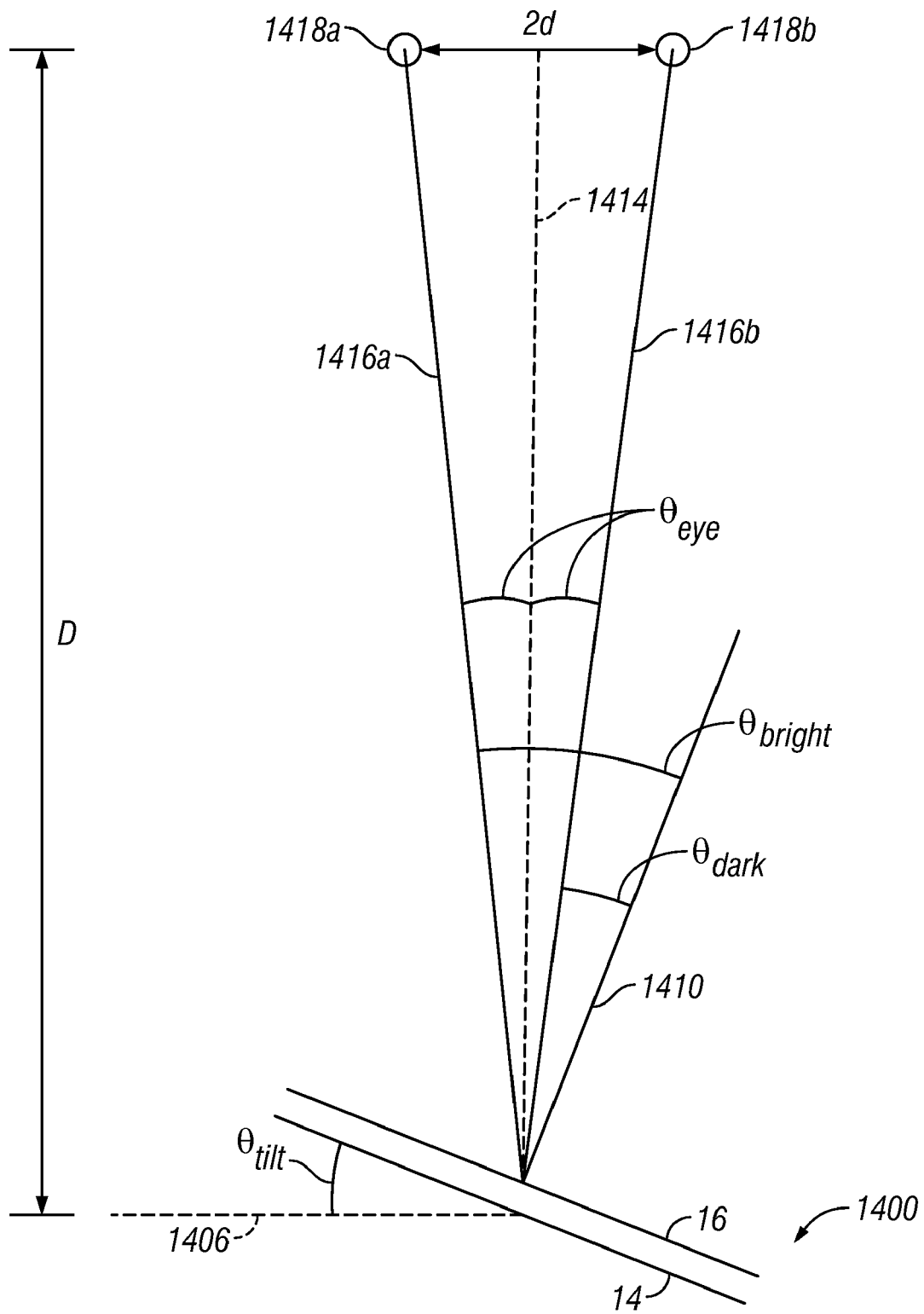
FIG. 14 schematically illustrates an embodiment of an interferometric modulator having a moveable layer and an optical stack that are generally parallel to each other. The interferometric modulator is tilted at an angle $\theta_{tilt}$ to the general plane of a substrate.

FIG. 14 schematically illustrates an embodiment of an interferometric modulator 1400 having a moveable layer 14 and an optical stack 16 that are generally parallel to each other. The interferometric modulator 1400 is oriented at an angle $\theta_{tilt}$ with respect to the general plane 1406 of the substrate 20 (not shown). The interferometric modulator 1400 may comprise any of the modulators illustrated in FIGS. 1, 7A-10. A normal direction substantially perpendicular to the interferometric modulator 1400 is illustrated as line 1410. The normal direction 1410 may be defined with respect to a suitable plane in the interferometric modulator 1400 such as, for example, a plane including the reflective layer 14, the optical stack 16, or the deformable layer 34 (if present). The interferometric modulator 1400 has an angularly-dependent reflectivity function, which has a first reflectivity in a first direction, indicated by line 1416a, and a second reflectivity in a second direction, indicated by line 1416b. The first reflectivity is greater than the second reflectivity. In this embodiment, the first reflectivity is representative of the high reflectivity region of the angularly-dependent reflectivity function, and the second reflectivity is representative of the low reflectivity region of the reflectivity function. As shown in FIG. 14, the first reflectivity is at an angle $\theta_{bright}$ from the normal direction 1410, and the second reflectivity is at an angle $\theta_{dark}$ from the normal direction 1410. Accordingly, substantially more light will be reflected from the interferometric modulator 1400 toward the first direction 1416a (at the bright angle) than toward the second direction 1416b (at the dark angle).

The first direction 1416a points toward a first location 1418a, and the second direction 1416b points toward a second location 1418b. The first and second locations 1418a, 1418b are separated by a distance denoted by 2d. The distance between the interferometric modulator 1400 and the locations 1418a, 1418b measured along a line 1414 perpendicular to the substrate 20 is denoted by D. For clarity of presentation in FIG. 14, the size of the interferometric modulator 1400 is schematically depicted to be much larger in relation to the distances d and D than is typical for many applications. For example, the movable reflective layer 14 of the interferometric modulator 1400 may have a size on the order of 200 μm×200 μm, while the distance D may be on the order of a few to tens of centimeters.

In certain embodiments, the first and second locations 1418a, 1418b may correspond to the first and second eyes, respectively, of an observer. The distance 2d then corresponds to the distance between the observer's eyes and may be in a range from about 5 cm to about 10 cm (depending on, e.g., the age of the observer). The distance D may represent an intended viewing distance of the display device comprising the interferometric modulator 1400. For example, if the display device is held in the observer's hand (e.g., a mobile telephone or a PDA), the distance D may be in a range from about 10 cm to about 100 cm. In certain embodiments, glasses or goggles worn by the observer may comprise the display device, and the distance D may be in a range from about 1 cm to about 10 cm.

The directions 1416a and 1416b subtend an angle $2\theta_{eye}$, measured from the interferometric modulator 1400. The angle $\theta_{eye}$ is related to the distances d and D by $$\theta_{eye} = \tan^{-1}\left(\frac{d}{D}\right). \quad (1)$$

Equation (1) may be used to determine the angle $\theta_{eye}$ for any combination of d and D. For example, the angle $\theta_{eye}$ is about 10 degrees for an interferometric modulator held about 30 cm away from an observer with an eye separation of about 10 cm.

As schematically depicted in FIG. 14, the interferometric modulator 1400 is tilted with respect to the general plane 1406 of the substrate 20 by the angle $\theta_{tilt}$ so that the high reflectivity region at $\theta_{bright}$ is directed toward the location 1418a and the low reflectivity region at $\theta_{dark}$ is directed toward the location 1418b. It can be shown from FIG. 14 that the angles $\theta_{eye}$, $\theta_{tilt}$, $\theta_{dark}$, and $\theta_{bright}$ are related by the following two equations:

$$2\theta_{eye} = \theta_{bright} - \theta_{dark} \quad (2)$$

$$\theta_{tilt} = \theta_{bright} - \theta_{eye} \quad (3)$$

Equations (2) and (3) can be rearranged to show that $$\theta_{eye} = \frac{1}{2}(\theta_{bright} - \theta_{dark}) \quad (4)$$

$$\theta_{tilt} = \frac{1}{2}(\theta_{bright} + \theta_{dark}) \quad (5)$$

Given values for any two of the four angles $\theta_{eye}$, $\theta_{tilt}$, $\theta_{dark}$, and $\theta_{bright}$, Equations (2) and (3) (or Eqs. (4) and (5)) may be used to determine values for the remaining two angles. For example, the bright and dark angles shown in FIG. 12 are about 34 degrees and 22 degrees, respectively. Equation (2) shows that $\theta_{eye}=6$ degrees, and Equation (3) shows that $\theta_{tilt}=28$ degrees. Accordingly, an interferometric modulator tilted by 28 degrees (with respect to the general plane 1406 of the substrate 20) will appear relatively bright to the location 1418a (e.g., a first eye of an observer) and relatively dark to the location 1418b (e.g., the second eye of the observer). Assuming a typical distance of about 10 cm between the observer's eyes (d=5 cm), Equation (1) shows that the intended viewing distance D of the interferometric modulator 1400 is about 48 cm.

Figure 15:
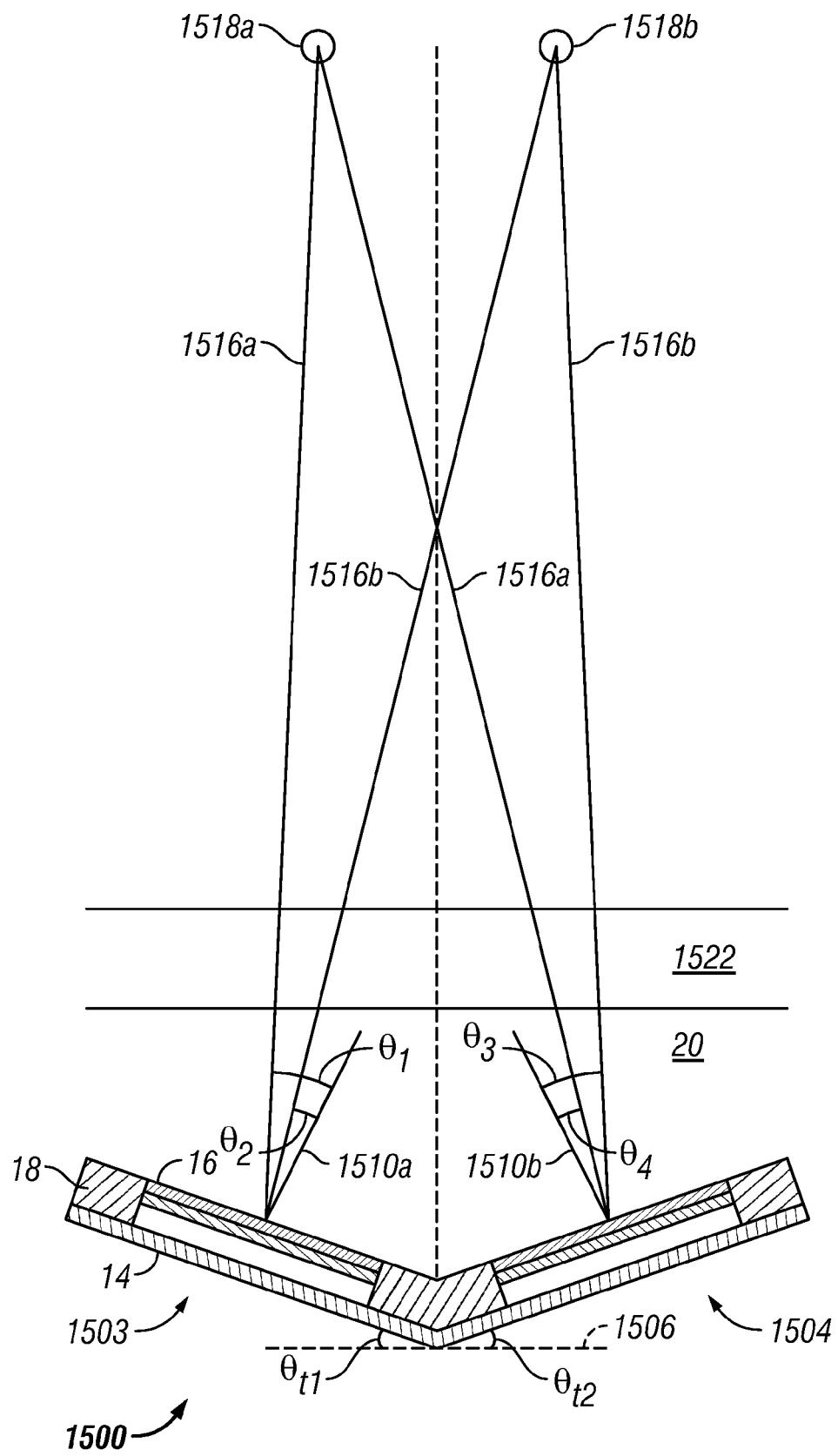
FIG. 15 schematically illustrates a pixel for a display device on a substrate.

FIG. 15 schematically illustrates a pixel 1500 for a display device on a substrate 20. The pixel 1500 comprises a first interferometric modulator 1503 on the substrate 20, the first interferometric modulator 1503 having a first normal direction 1510a perpendicular to the first interferometric modulator 1503. The first interferometric modulator 1503 also has a first angularly-dependent reflectivity function comprising a first reflectivity in a first direction 1516a and a second reflectivity in a second direction 1516b, the first reflectivity greater than the second reflectivity. The pixel 1500 also comprises a second interferometric modulator 1504 on the substrate 20, the second interferometric modulator 1504 having a second normal direction 1510b perpendicular to the second interferometric modulator 1504. The second interferometric modulator 1504 also has a second angularly-dependent reflectivity function comprising a third reflectivity in the second direction 1516b and a fourth reflectivity in the first direction 1516a, the third reflectivity greater than the fourth reflectivity.

The general structure of the interferometric modulators 1503 and 1504 schematically depicted in FIG. 15 is chosen to be similar to that shown in FIG. 7A and in FIGS. 8A and 9 for illustrative purposes only. The principles described herein will apply to other interferometric modulator structures as well. For example, the interferometric modulators 1503 and 1504 may comprise any of the interferometric modulators shown in FIGS. 1, and 7A-10. In some embodiments, the pixel 1500 comprises the interferometric modulators 803 and 804 shown in FIG. 8A, the interferometric modulators 903 and 904 shown in FIG. 9, or the interferometric modulators 1006 and 1007 shown in FIG. 10. The pixel 1500 may also comprise interferometric modulators depicted in FIG. 8B, in which the optical stack is generally parallel to the substrate 20 but the reflective layer 14 is inclined at an angle to the substrate 20.

The first and the second angularly-dependent reflectivity functions may be similar to the angularly-dependent reflectivity functions described with reference to FIGS. 12 and 13A-13B. The first reflectivity and the second reflectivity of the first interferometric modulator 1503 may correspond to the reflectivities at the angles $\theta_{bright}$ and $\theta_{dark}$, respectively, of the first angularly-dependent reflectivity function. The third reflectivity and the fourth reflectivity of the second interferometric modulator 1504 may correspond to the reflectivities at the angles $\theta_{bright}$ and $\theta_{dark}$, respectively, of the second angularly-dependent reflectivity function. As described above, in many embodiments, the angle $\theta_{bright}$ is greater than the angle $\theta_{dark}$.

As schematically illustrated in FIG. 15, in certain embodiments of the pixel 1500, a first angle $\theta_1$ between the first direction 1516a and the first normal direction 1510a is greater than a second angle $\theta_2$ between the second direction 1516b and the first normal direction 1510a. Further, in certain such embodiments, a third angle $\theta_3$ between the second direction 1516b and the second normal direction 1510b is greater than a fourth angle $\theta_4$ between the first direction 1516a and the second normal direction 1510b.

In certain embodiments of the pixel 1500, the first interferometric modulator 1503 is tilted with respect to a general plane 1506 of the substrate 20 by a first tilt angle $\theta_{t1}$ and the second interferometric modulator 1504 is tilted with respect to the plane 1506 of the substrate 20 by a second tilt angle $\theta_{t2}$. Either or both the angles $\theta_{t1}$ and $\theta_{t2}$ may be selected to be substantially equal to the tilt angle $\theta_{tilt}$ described with reference to Equations (3) and (5). For example, in some embodiments, the first tilt angle $\theta_{t1}$ is approximately one half of the sum of the first angle $\theta_1$ and the second angle $\theta_2$, and the second tilt angle $\theta_{t2}$ is approximately one half of the sum of the third angle $\theta_3$ and the fourth angle $\theta_4$. In certain embodiments of the pixel 1500, the first angle $\theta_1$ or the third angle $\theta_3$ is in a range from about 20 degrees to about 40 degrees. In another embodiment of the pixel 1500, the difference between the first angle $\theta_1$ and the second angle $\theta_2$ is in a range from about 5 degrees to about 30 degrees. In another embodiment of the pixel 1500, the difference between the third angle $\theta_3$ and the fourth angle $\theta_4$ is in a range from about 5 degrees to about 30 degrees.

The angularly-dependent reflectivity function typically exhibits significant angular variation (such as shown in FIGS. 12, 13A-13B) when light in a relatively narrow wavelength range is incident on or reflected from an interferometric modulator. In some embodiments of the pixel 1500, the substrate 20 is substantially transmissive to visible light in a selected wavelength range, which may be chosen to provide desired viewing properties of the display device. For example, the wavelength range may be selected to provide desired reflectivities, bright angle, and/or dark angle for the first and/or the second angularly-dependent reflectivity function. In some embodiments, the selected wavelength range comprises red light, green light, or blue light. The wavelength range may be selected to have a bandwidth of about 10 nm, 20 nm, 40 nm, 60 nm, 100 nm, or 200 nm in various embodiments.

As schematically shown in FIG. 15, embodiments of the pixel 1500 may also comprise a filter 1522 positioned such that light transmitted through the filter 1522 is incident on or reflected from the first interferometric modulator 1503 (and/or the interferometric modulator 1504). The filter 1522 may be substantially transmissive to light in a selected wavelength range. The selected wavelength range may include a portion of the visible light spectrum such as, for example, red light, green light, or blue light. The selected wavelength range of the filter 1522 may have a bandwidth from about 10 nm to about 100 nm, in various embodiments. In some embodiments, the selected wavelength range includes a central wavelength and has a bandwidth that may be measured in terms of a full-width half-maximum (FWHM) of the filter transmission function. For example, in some RGB embodiments, the red filter has a central wavelength of about 610 nm and an FWHM bandwidth of about 40 nm, the green filter has a central wavelength of about 530 nm and an FWHM bandwidth of about 40 nm, and the blue filter has a central wavelength of about 480 nm and a bandwidth of about 40 nm. Filters having different central wavelengths and/or different bandwidths may be used in other embodiments. The filter 1522 may be on or adjacent to the substrate as shown in FIG. 15. In certain embodiments, the filter 1522 is between the interferometric modulators 1503, 1504 and the incident light and/or the observer. In certain embodiments, the filter may replace or be used in addition to the diffusive layer 822, 922, 1022 shown in FIGS. 8, 9, and 10, respectively.

A display device may comprise a plurality of the pixels 1500 on the substrate 20. The device may be configured to display a first image in the first direction 1516a and a second image in the second direction 1516b. In some embodiments, the display device is positionable such that the first direction 1516a is directed to a first eye of a user of the device, and the second direction 1516b is directed to a second eye of the user. In order to produce an image appearing three-dimensional to the user, the first image and the second image may be displayed substantially simultaneously to the user. The first image and the second image may obey a stereoscopic relationship to each other in order to produce the image appearing three-dimensional to the user.

Figure 16A:
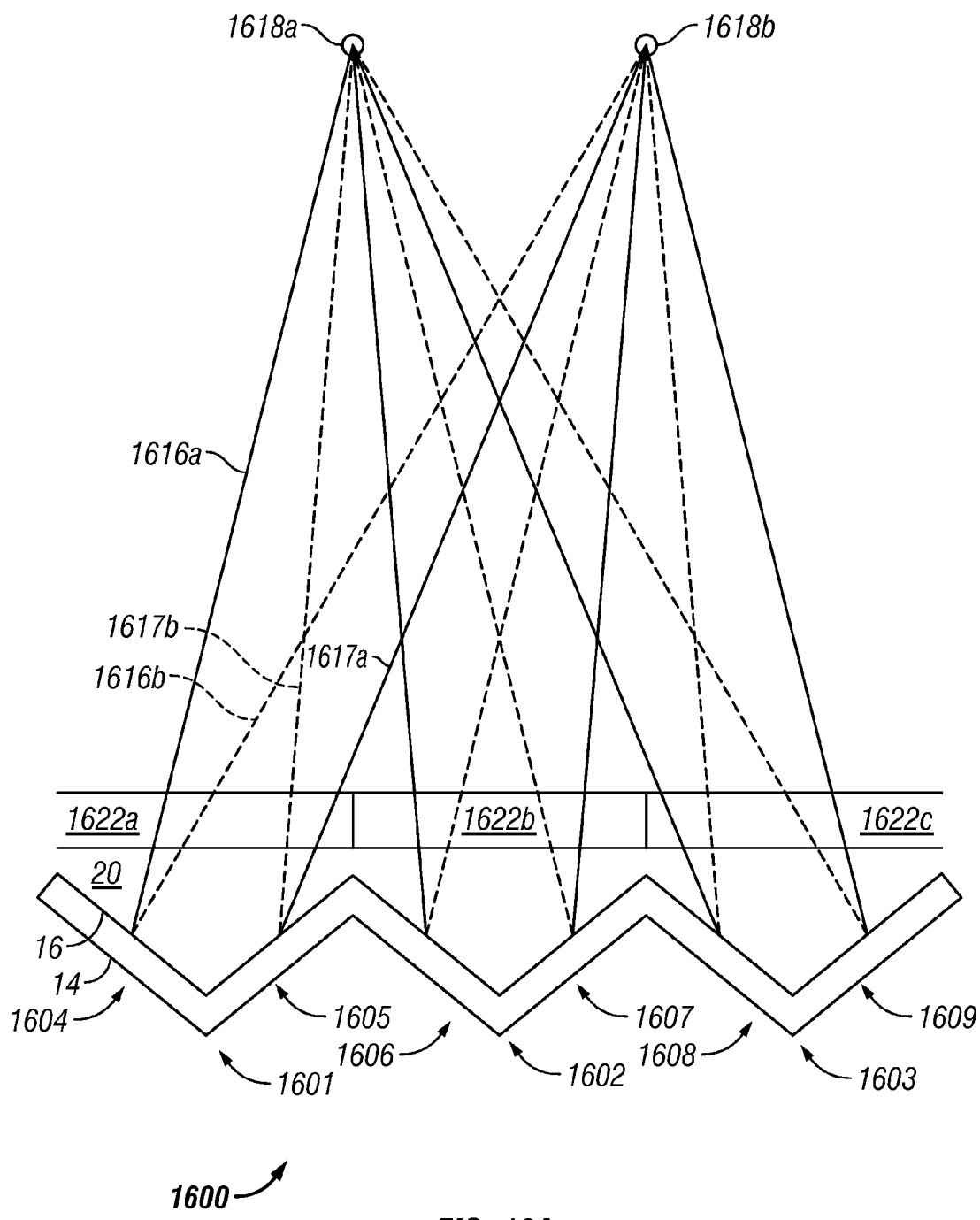
FIG. 16A schematically illustrates an embodiment of a display device comprising a plurality of pixels on a substrate.

FIG. 16A schematically illustrates an embodiment of a display device 1600 comprising a plurality of pixels 1601-1603 on a substrate 20, where the pixel 1601 comprises first and second interferometric modulators 1604 and 1605, the pixel 1602 comprises first and second interferometric modulators 1606 and 1607, and the pixel 1603 comprises first and second interferometric modulators 1608 and 1609. The pixel 1601 may be configured so that the interferometric modulator 1604 appears reflective in a first direction 1616a and non-reflective in a second direction 1616b, and the second interferometric modulator 1605 appears reflective in a third direction 1617a and non-reflective in a fourth direction 1617b. In some embodiments, the display device 1600 is positionable such that the first and third directions 1616a, 1617a are directed to a first eye 1618a of an observer of the device 1600, and the second and fourth directions 1616b, 1617b are directed to a second eye 1618b of the observer. Because in many applications the distance between the device 1600 and the observer's eyes 1618a, 1618b is much larger than depicted in FIG. 16A, the first direction 1616a is substantially parallel to the third direction 1617a, and the second direction 1616b is substantially parallel to the fourth direction 1617b. In a similar fashion to that described above with reference to FIGS. 12-16, the pixels 1602 and 1603 may be configured so to take advantage of the angularly-dependent reflectivity functions of their associated interferometric modulators in order to appear reflective to the eyes 1618a, 1618b of the observer. The device 1600 may be positionable to display a first image to the first eye 1618a of the observer and a second image to the second eye 1618b of the observer. Accordingly, if the first and the second images obey a stereoscopic relationship, the display device 1600 may display an image that appears three-dimensional to the observer.

The display device 1600 may comprise filters 1622a-1622c that are positioned such that light transmitted through the filters 1622a-1622c is incident on or reflected from the corresponding pixels 1601-1603. As described above for the filter 1522, the filters 1622a-1622c may be substantially transmissive to visible light in a selected wavelength range, which may comprise red light, green light, or blue light. Other wavelength ranges and/or colors may be used in other embodiments. Although schematically illustrated in FIG. 16 as three filters 1622a-1622c, in some embodiments a single filter layer is used, for example, as depicted for the diffuse layer 822, 922, 1022 in FIGS. 8A, 9, and 10.

Figure 16B:
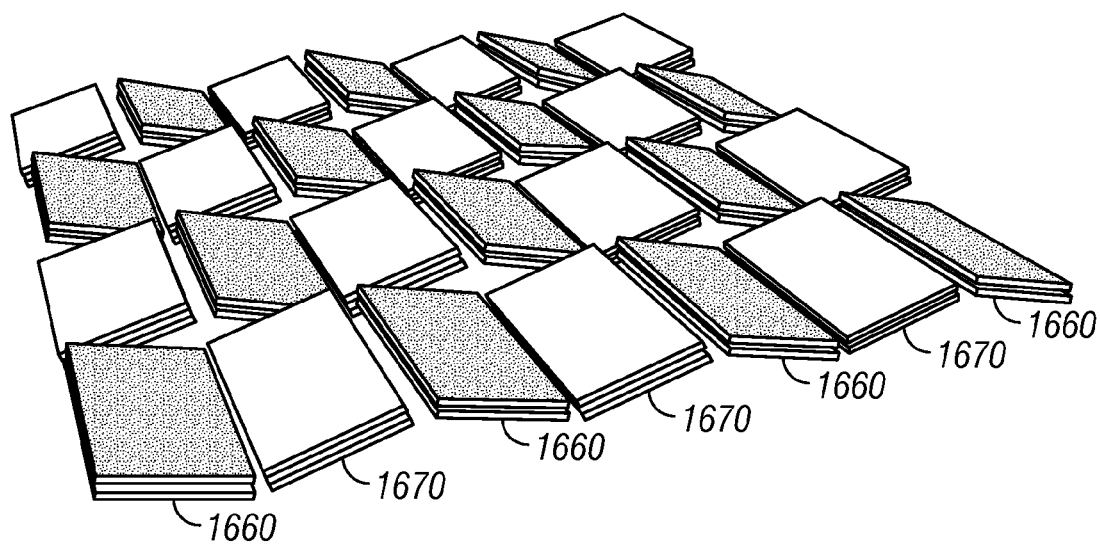
FIG. 16B is a perspective view that schematically illustrates a monochromatic display device comprising an array of interferometric modulators.

The display device 1600 may be configured to display monochromatic images. In such embodiments, each of the pixels 1601-1603 may be configured to reflect light in the monochromatic wavelength range. For example, each of the filters 1622a-1622c may be selected to be substantially transmissive to visible light in the monochromatic wavelength range. Accordingly, when the display device 1600 is viewed by an observer, the light reflected from the device 1600 will be in the monochromatic wavelength range, and images displayed by the device will appear monochromatic. The monochromatic wavelength range may comprise red, green, or blue light, or some other desired wavelength range. FIG. 16B is a perspective view that schematically illustrates a monochromatic display device comprising an array of interferometric modulators 1660, 1670. The interferometric modulators 1660 are configured to display a first image to a first eye of the observer, and the interferometric modulators 1670 are configured to display a second image to a second eye of the observer. In some embodiments, the first and second images are displayed substantially simultaneously and appear three-dimensional to the observer.

The display device 1600 may be configured to display color images. For a color display device, the pixels 1601-1603 may be configured to display three colors, for example, one pixel each for red, green, and blue ("RGB") light. In one illustrative embodiment of the display device 1600, the filter 1622a is selected to transmit red light so that the pixel 1601 appears red; the filter 1622b is selected to transmit green light so that the pixel 1602 appears green; and the filter 1622c is selected to transmit blue light so that the pixel 1603 appears blue. In other embodiments, the order of colors (and the colors themselves) displayed by the pixels 1601-1603 may be different.

In some color display embodiments, the properties of the interferometric modulators for the pixels 1601-1603 are selected so that the angularly-dependent reflectivity functions (for light in the appropriate wavelength range) for each of the interferometric modulators are substantially the same in shape and/or magnitude in a suitable angular range. In some embodiments, the angular range includes at least a portion of the high reflectivity regions of the angularly-dependent reflectivity functions near the bright angle $\theta_{bright}$. For example, in certain embodiments, the reflectivity in red light at the bright angle is substantially the same as the reflectivity in green light (and/or blue light) at the bright angle. Such embodiments advantageously may be used to display the three colors (e.g., red, green, and blue) simultaneously to the eyes 1618a, 1618b of the observer so that the displayed color image appears three-dimensional. For example, the width of the gap between the optical stack 16 and the reflective layer 14 (as measured in the unactuated state) may be selected so that the angularly-dependent reflectivity function for each of the color pixels is substantially the same.

Figure 17:
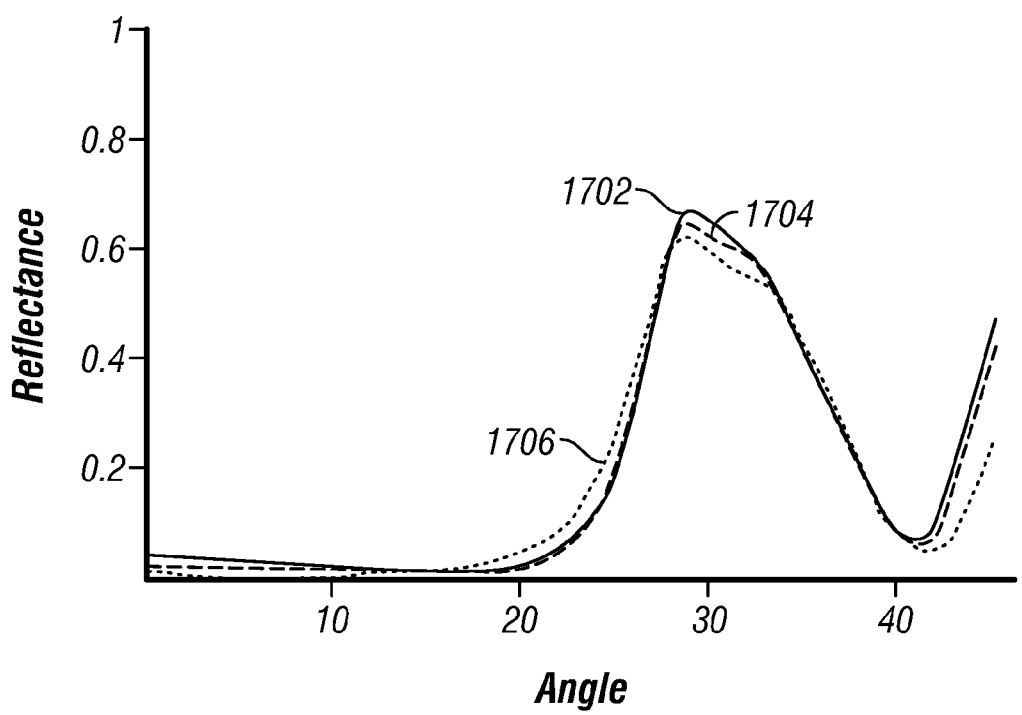
FIG. 17 is a graph displaying the angularly-dependent reflectivity function in red, green, and blue light for interferometric modulators having different unactuated gap widths.

FIG. 17 is a graph demonstrating that by selecting suitable dimensions for the unactuated gap width, interferometric modulators can provide substantially similar angular reflectivity for light of three different colors. Curve 1702 is the angularly-dependent reflectivity function in red light (600 nm) for an interferometric modulator having an unactuated gap width of about 350 nm. Curve 1704 is the angularly-dependent reflectivity function in green light (550 nm) for an interferometric modulator having an unactuated gap width of about 310 nm. Curve 1706 is the angularly-dependent reflectivity function in blue light (450 nm) for an interferometric modulator having an unactuated gap width of about 230 nm.

Accordingly, in some embodiments of the display device 1600, the interferometric modulators 1604, 1605 in the "red" pixel 1601 have an unactuated gap width of about 350 nm, the interferometric modulators 1606, 1607 in the "green" pixel 1602 have an unactuated gap width of about 310 nm, and the interferometric modulators 1608, 1609 in the "blue" pixel 1603 have an unactuated gap width of about 230 nm.

In certain techniques for providing a color display, a bright angle $\theta_{bright}$ and a dark angle $\theta_{dark}$ are selected as described above with reference to FIGS. 12-13B. The angles $\theta_{eye}$ and $\theta_{tilt}$ may be determined from Equations (4) and (5), respectively. The unactuated gap widths of the interferometric modulators in each pixel representing a particular RGB color (or a color in any other color model) are selected so that the bright and dark angles $\theta_{bright}$, $\theta_{dark}$ are substantially equal. In certain such techniques, the unactuated gap widths are selected so that the angularly-dependent reflectivity functions for each of the colors in the color model (e.g., R, G, and B) are substantially the same in shape and/or magnitude over an appropriate angular range such as, for example, the high reflectivity angularly range near $\theta_{bright}$. In some embodiments, properties of the interferometric modulators may be selected to improve or optimize one or more characteristics of the display device such as, for example, reflectivity in one or more colors, depth of field, intended viewing distance, and so forth.

The display devices comprising interferometric modulators described herein can be fabricated using conventional thin layer processes including, for example, photolithography, deposition, etching, patterning, and masking techniques. An embodiment of a method for making a display device comprising the interferometric modulators 1503 and 1504 shown in FIG. 15 will now be described. In this method, a first angular range relative to a substrate 20 is selected. A first interferometric modulator 1503 is formed on the substrate 20. The first interferometric modulator 1503 comprises two at least partially reflective layers (e.g., the reflective layer 14 and the optical stack 16) separated by a first distance when the first interferometric modulator 1503 is in an unactuated state. The first interferometric modulator is oriented at a nonzero first tilt angle $\theta_{t1}$ with respect to the substrate 20. The first interferometric modulator has a first angularly-dependent reflectivity function. The first distance is selected such that the first angularly-dependent reflectivity function is substantially greater than zero in the first selected angular range. For example, the first selected angular range may correspond to the high reflectivity region near the bright angle $\theta_{bright}$. The first tilt angle $\theta_{t1}$ may be selected at least in part on the first angularly-dependent reflectivity function in the first selected angular range. For example, in some embodiments, the first tilt angle $\theta_{t1}$ is determined from the bright and dark angles $\theta_{bright}$, $\theta_{dark}$ according to Equation (5).

The method may also comprise selecting a second angular range relative to the substrate 20. A second interferometric modulator 1504 is formed on the substrate 20. The second interferometric modulator 1504 comprises two at least partially reflective layers separated by a second distance when the second interferometric modulator 1504 is in an unactuated state. The second interferometric modulator is oriented at a nonzero second tilt angle $\theta_{t2}$ with respect to the substrate 20. The second interferometric modulator has a second angularly-dependent reflectivity function. The second distance is selected such that the second angularly-dependent reflectivity function is substantially greater than zero in the second selected angular range. For example, the second selected angular range may correspond to the high reflectivity region near the bright angle $\theta_{bright}$. The second tilt angle $\theta_{t2}$ may be selected at least in part on the second angularly-dependent reflectivity function in the second selected angular range. For example, in some embodiments, the second tilt angle $\theta_{t2}$ is determined from the bright and dark angles $\theta_{bright}$, $\theta_{dark}$ according to Equation (5).

In some embodiments of the method, the first distance or the second distance is selected such that the first angularly-dependent reflectivity function in the first selected angular range and the second angularly-dependent reflectivity function in the second selected angular range are substantially the same.

The method may further comprise providing a first filter that transmits visible light in a first selected wavelength range to the first interferometric modulator 1503 and providing a second filter that transmits visible light in a second selected wavelength range to the second interferometric modulator 1504. The first or the second wavelength range may comprise red, green, or blue light. In some embodiments, the filter 1522 shown in FIG. 15 comprises the first and the second filter. Referring to FIG. 16A, in other embodiments, the filter 1622a comprises the first filter for the first interferometric modulator 1604, and the filter 1622b comprises the second filter for the second interferometric modulator 1606. Embodiments of the method may also comprise selecting the first distance and the second distance such that the first angularly-dependent reflectivity function in the first selected angular range and the second angularly-dependent reflectivity function in the second selected angular range are substantially the same. In such embodiments, the first angularly-dependent reflectivity function may be for light in the first wavelength range that is incident on or reflected from the first interferometric modulator 1503. Also, the second angularly-dependent reflectivity function may be for light in the second wavelength range that is incident on or reflected from the second interferometric modulator 1504. For example, FIG. 17 illustrates angularly-dependent reflectivity functions (for red, green, and blue light) that are substantially the same at least in an angular range between about 10 degrees and about 40 degrees. The angular range in which the angularly-dependent reflectivity functions are substantially the same may include the regions of relatively high reflectivity and relatively low reflectivity represented by bright and dark angles, $\theta_{bright}$ and $\theta_{dark}$, respectively. In some embodiments, the first and the second angularly-dependent reflectivity functions are substantially the same to within about 10 percent in the first and the second angular ranges.

Figure 18:
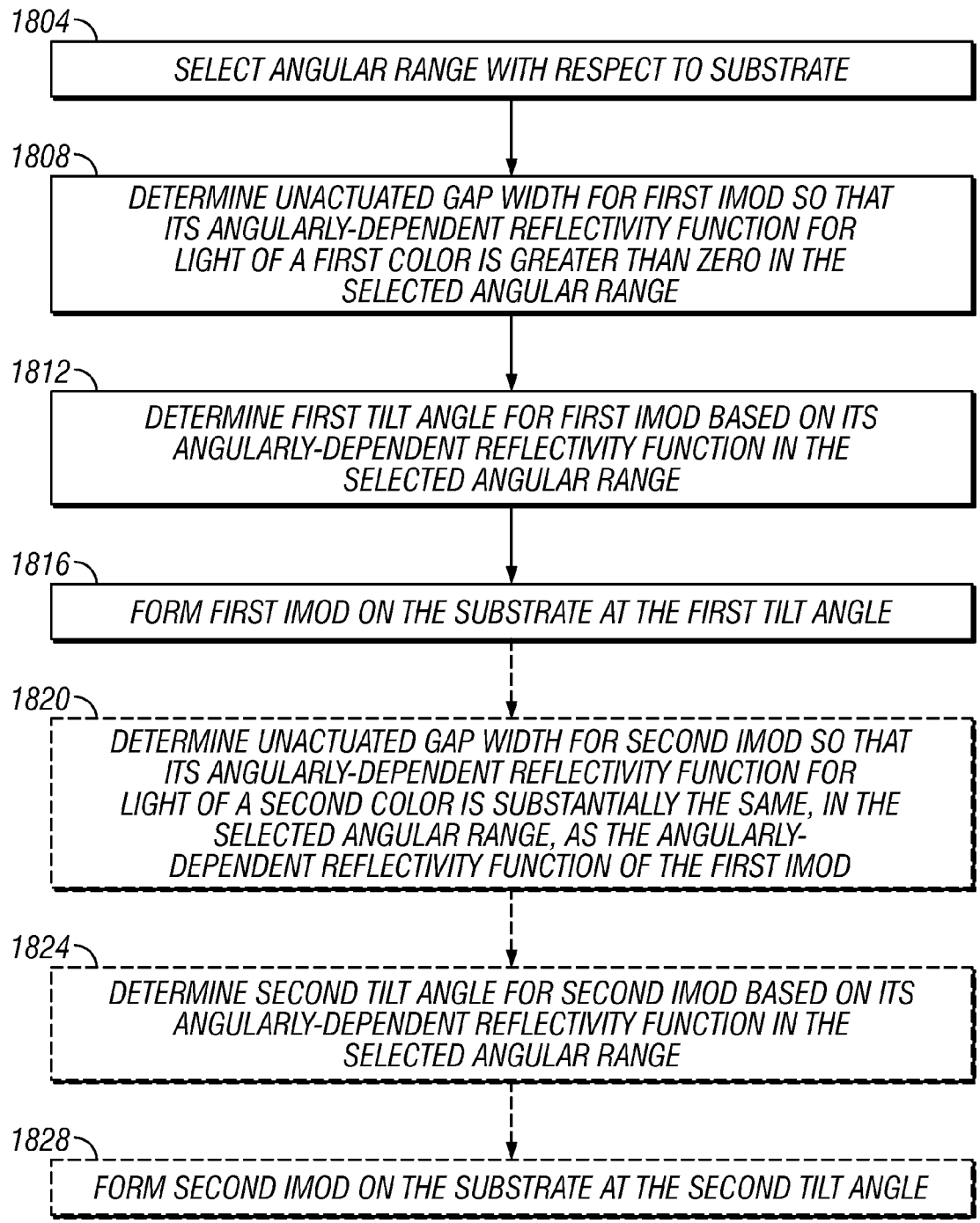
FIG. 18 is a flow chart that illustrates an embodiment of a method for making a display device.

FIG. 18 is a flow chart that illustrates an embodiment of a method 1800 for making a display device. The display device may comprise a plurality of pixels comprising interferometric modulators formed on a substrate, for example, as described above with reference to FIGS. 8A-11 and 14-16B. The interferometric modulators may comprise two or more at least partially reflective layers separated by an unactuated gap width. For example, the partially reflective layers may include the movable reflective layer 14 and the optical stack 16. In block 1804 of the example method 1800, an angular range with respect to the substrate is selected. In block 1808, the unactuated gap width for a first interferometric modulator is determined so that its angularly-dependent reflectivity function is substantially greater than zero for angles in the angular range selected in block 1804. For example, the unactuated gap width may be determined so that the region of high-reflectivity shown and described with reference to FIGS. 12-13B is included in the selected angular range. The bright and dark angles, $\theta_{bright}$ and $\theta_{dark}$, may be included in the selected angular range. In some embodiments, the angularly-dependent reflectivity function is for light incident on or transmitted from the first interferometric modulator in a first range of wavelengths such as, for example, red light, green light, or blue light. In block 1812, a first tilt angle is determined for the first interferometric modulator based at least in part on the angularly-dependent reflectivity function in the selected angular range. For example, the first tilt angle may be determined from Equations (3) or (5) based on the bright and dark angles, $\theta_{bright}$, $\theta_{dark}$. In block 1816, the first interferometric modulator is formed on the substrate at the first tilt angle. In some embodiments, the display device displays monochromatic images in the first wavelength range, and additional interferometric modulators of the display device may be formed on the substrate according to blocks 1804-1816.

In certain embodiments, the display device may display color images. In certain such embodiments, the method 1800 may include additional, optional blocks 1820-1828 shown in FIG. 18. In block 1820, the unactuated gap width for a second interferometric modulator is determined so that its angularly-dependent reflectivity function, in the angular range selected in block 1804, is substantially the same as the angularly-dependent reflectivity function of the first interferometric modulator. In block 1820, the angularly-dependent reflectivity function may be for light incident on or transmitted from the second interferometric modulator in a second range of wavelengths such as, for example, red light, green light, or blue light. The second wavelength range may be different from the first wavelength range (for the first interferometric modulator). For example, the first interferometric modulator may be configured to display red light, and the second interferometric modulator may be configured to display green or blue light. Other colors may be used in other embodiments of the display device.

In an example of block 1820, the unactuated gap width of the second interferometric modulator is determined so that the bright and dark angles of the second interferometric modulator's angularly-dependent reflectivity function are substantially equal to the bright and dark angles of the first interferometric modulator's angularly-dependent reflectivity function. In another example, the unactuated gap width of the second interferometric modulator is determined so that the magnitude and shape of the second interferometric modulator's angularly-dependent reflectivity function substantially matches the magnitude and shape of the first interferometric modulator's angularly-dependent reflectivity function as shown, for example, in FIG. 17. In another example, the actions of blocks 1808 and 1820 are combined, and the unactuated gap widths of both the first and the second interferometric modulator are determined together so that their respective angularly-dependent reflectivity functions substantially match (e.g., via least squares, regression, or other "best fit" statistical procedures).

The method 1800 continues in block 1824 in which a second tilt angle for the second interferometric modulator may be determined based on the second angularly-dependent reflectivity function in the selected angular range. As described above, the second tilt angle may be determined from, for example, Equations (3) or (5). In block 1828, the second interferometric modulator is formed on the substrate at the second tilt angle.

For display devices displaying a third (or greater) range of wavelengths, the unactuated gap width for the interferometric modulators displaying the third (or greater) color may be determined analogously to the actions of blocks 1820-1828. For example, FIG. 17 demonstrates that substantially similar angular reflectivity functions for light of three different colors (e.g., R, G, and B) can be provided by suitably determining the unactuated gap widths for three interferometric modulators.

Although certain preferred embodiments and examples are discussed above, it is understood that the inventive subject matter extends beyond the specifically disclosed embodiments to other alternative embodiments and/or uses of the invention and obvious modifications and equivalents thereof It is intended that the scope of the inventions disclosed herein should not be limited by the particular disclosed embodiments. Thus, for example, in any method or process disclosed herein, the acts or operations making up the method/process may be performed in any suitable sequence and are not necessarily limited to any particular disclosed sequence. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. A pixel for a display device on a substrate, the pixel comprising:
    a first interferometric modulator on the substrate, the first interferometric modulator having a first normal direction substantially perpendicular to the first interferometric modulator and a first angularly-dependent reflectivity function comprising a first reflectivity in a first direction and a second reflectivity in a second direction, the first reflectivity greater than the second reflectivity, wherein a first angle between the first direction and the first normal direction is greater than a second angle between the second direction and the first normal direction; and
    a second interferometric modulator on the substrate, the second interferometric modulator having a second normal direction substantially perpendicular to the second interferometric modulator and a second angularly-dependent reflectivity function comprising a third reflectivity in the second direction and a fourth reflectivity in the first direction, the third reflectivity greater than the fourth reflectivity, wherein a third angle between the second direction and the second normal direction is greater than a fourth angle between the first direction and the second normal direction,
    wherein the first interferometric modulator is tilted with respect to a general plane of the substrate by a first tilt angle and the second interferometric modulator is tilted with respect to the general plane of the substrate by a second tilt angle, the first tilt angle approximately one half of the sum of the first angle and the second angle, and the second tilt angle approximately one half of the sum of the third angle and the fourth angle.

2. The pixel of claim 1, wherein the first angle or the third angle is in a range from about 20 degrees to about 40 degrees.

3. The pixel of claim 1, wherein the difference between the first angle and the second angle or the difference between the third angle and the fourth angle is in a range from about 5 degrees to about 30 degrees.

4. The pixel of claim 1, wherein the substrate is substantially transmissive to light in a selected wavelength range.

5. The pixel of claim 4, wherein the selected wavelength range comprises red light, green light, or blue light.

6. The pixel of claim 4, wherein the wavelength range has a bandwidth in a range from about 20 nm to about 100 nm.

7. The pixel of claim 1, further comprising a filter positioned such that light transmitted through the filter is incident on or reflected from the first interferometric modulator, the filter substantially transmissive to light in a selected wavelength range.

8. The pixel of claim 7, wherein the filter is on or adjacent to the substrate.

9. The pixel of claim 7, wherein the selected wavelength range includes red light, green light, or blue light.

10. The pixel of claim 7, wherein the selected wavelength range has a bandwidth in a range from about 20 nm to about 100 nm.

11. The pixel of claim 1, wherein the display device is positionable such that the first direction is directed to a first eye of a user and the second direction is directed to a second eye of the user.

12. The pixel of claim 1, further comprising:
the display device;
a processor that is configured to communicate with the display device, the processor being configured to process image data; and
a memory device that is configured to communicate with the processor.

13. The pixel of claim 12, further comprising a driver circuit configured to send at least one signal to the display device.

14. The pixel of claim 13, further comprising a controller configured to send at least a portion of the image data to the driver circuit.

15. The pixel of claim 12, further comprising an image source module configured to send the image data to the processor.

16. The pixel of claim 15, wherein the image source module comprises at least one of a receiver, transceiver, and transmitter.

17. The pixel of claim 1, further comprising an input device configured to receive input data and to communicate the input data to the processor.

18. A display device comprising a plurality of pixels on a substrate, each pixel comprising:
a first interferometric modulator on the substrate, the first interferometric modulator having a first normal direction substantially perpendicular to the first interferometric modulator and a first angularly-dependent reflectivity function comprising a first reflectivity in a first direction and a second reflectivity in a second direction, the first reflectivity greater than the second reflectivity, wherein a first angle between the first direction and the first normal direction is greater than a second angle between the second direction and the first normal direction; and
a second interferometric modulator on the substrate, the second interferometric modulator having a second normal direction substantially perpendicular to the second interferometric modulator and a second angularly-dependent reflectivity function comprising a third reflectivity in the second direction and a fourth reflectivity in the first direction, the third reflectivity greater than the fourth reflectivity, wherein a third angle between the second direction and the second normal direction is greater than a fourth angle between the first direction and the second normal direction,
wherein the first interferometric modulator is tilted with respect to a general plane of the substrate by a first tilt angle and the second interferometric modulator is tilted with respect to the general plane of the substrate by a second tilt angle, the first tilt angle approximately one half of the sum of the first angle and the second angle, and the second tilt angle approximately one half of the sum of the third angle and the fourth angle.

19. The display device of claim 18, wherein the device is configured to display a first image in the first direction and a second image in the second direction.

20. The display device of claim 19, wherein the display device is positionable such that the first direction is directed to a first eye of a user and the second direction is directed to a second eye of the user.

21. The display device of claim 20, wherein the first image and the second image are displayed substantially simultaneously to the user to produce an image appearing three-dimensional to the user.

22. A pixel for a display device, the pixel comprising:
a first means for interferometrically modulating light, the first modulating means formed on a substrate, the first modulating means having a first normal direction substantially perpendicular to the first modulating means and a first angularly-dependent reflectivity function comprising a first reflectivity in a first direction and a second reflectivity in a second direction, the first reflectivity greater than the second reflectivity, wherein a first angle between the first direction and the first normal direction eater a second angle between the second direction and the first normal direction; and
a second means for interferometrically modulating light, the second modulating means formed on the substrate, the second modulating means having a second normal direction substantially perpendicular to the second modulating means and a second angularly-dependent reflectivity function comprising a third reflectivity in the second direction and a fourth reflectivity in the first direction, the third reflectivity greater than the fourth reflectivity, wherein a third angle between the second direction and the second normal direction is greater than a fourth angle between the first direction and the second normal direction,
wherein the first modulating means is tilted with respect to a general plane of the substrate by a first tilt angle and the second modulating means is tilted with respect to the general plane of the substrate by a second tilt angle, the first tilt angle approximately one half of the sum of the first angle and the second angle, and the second tilt angle approximately one half of the sum of the third angle and the fourth angle.

23. The pixel of claim 22, wherein the first modulating means or the second modulating means comprises an interferometric modulator.

* * * * *

UNITED STATES PATENT AND TRADEMARK OFFICE
CERTIFICATE OF CORRECTION

PATENT NO. : 7,847,999 B2  Page 1 of 1
APPLICATION NO. : 11/971830
DATED : December 7, 2010
INVENTOR(S) : Lee et al.

It is certified that error appears in the above-identified patent and that said Letters Patent is hereby corrected as shown below:

In column 16 at line 67, after "$\theta_{tilt}=\theta_{bright}-\theta_{eye}$" insert --.--.

In column 24 at line 8, after "thereof" insert --.--.

In column 26 at line 34, in Claim 22, change "eater" to --is greater than--.

Signed and Sealed this
Thirty-first Day of May, 2011

David J. Kappos
*Director of the United States Patent and Trademark Office*